US012623796B2

(12) United States Patent
Zarrouk et al.

(10) Patent No.: US 12,623,796 B2
(45) Date of Patent: May 12, 2026

(54) HYBRID FLYING DRIVING ROBOT WITH A CLUTCH MECHANISM FOR ENERGY EFFICIENCY

(71) Applicant: B.G. NEGEV TECHNOLOGIES AND APPLICATIONS LTD., AT BEN-GURION UNIVERSITY, Beer-Sheva (IL)

(72) Inventors: David Zarrouk, Haifa (IL); Eran Gefen, Rehovot (IL)

(73) Assignee: B.G. NEGEV TECHNOLOGIES AND APPLICATIONS LTD., AT BEN-GURION UNIVERSITY, Beer-Sheva (IL)

( * ) Notice: Subject to any disclaimer, the term of this patent is extended or adjusted under 35 U.S.C. 154(b) by 0 days.

(21) Appl. No.: 18/843,981

(22) PCT Filed: Apr. 2, 2023

(86) PCT No.: PCT/IL2023/050342
§ 371 (c)(1),
(2) Date: Sep. 4, 2024

(87) PCT Pub. No.: WO2023/194989
PCT Pub. Date: Oct. 12, 2023

(65) Prior Publication Data
US 2025/0178755 A1 Jun. 5, 2025

(30) Foreign Application Priority Data
Apr. 3, 2022 (IL) .......................................... 291912

(51) Int. Cl.
*B64U 10/70* (2023.01)
*B64U 10/14* (2023.01)
(Continued)

(52) U.S. Cl.
CPC ............. *B64U 10/70* (2023.01); *B64U 10/14* (2023.01); *B64U 50/23* (2023.01); *F16D 11/14* (2013.01);
(Continued)

(58) Field of Classification Search
CPC . B64U 10/70; B64C 37/00; B60F 5/02; B60F 3/0061; B60F 3/0007; B62D 57/04; B62D 57/028
See application file for complete search history.

(56) References Cited

U.S. PATENT DOCUMENTS

| | | | |
|---|---|---|---|
| 11,312,194 B2 * | 4/2022 | Ker | B60K 6/26 |
| 2012/0024654 A1 * | 2/2012 | Kim | F16D 23/12 |
| | | | 192/84.9 |

FOREIGN PATENT DOCUMENTS

| | | | |
|---|---|---|---|
| WO | 2019130303 A1 | 7/2019 | |
| WO | WO-2022065519 A1 * | 3/2022 | B64C 39/02 |

OTHER PUBLICATIONS

International Search Report for PCT/IL2023/050342, mailed Aug. 28, 2023, 4 pages.
(Continued)

*Primary Examiner* — Arfan Y. Sinaki
(74) *Attorney, Agent, or Firm* — Nixon & Vanderhye PC

(57) ABSTRACT

The present invention relates to a hybrid flying and driving robot comprising a plurality of wheels; a plurality of propellers; a plurality of motors, each of which is configured to drive the rotation of a respective wheel of said plurality of wheels; wherein each respective motor of said plurality of motors is connected to a respective propeller of said plurality of propellers by means of a respective gear arrangement; wherein each respective gear arrangement is rearrangeable between two configurations: a) a first configuration wherein the respective motor is configured to drive the rotation of the respective propeller; b) a second configuration wherein the
(Continued)

respective motor does not drive the rotation of the respective propeller.

14 Claims, 22 Drawing Sheets

(51) Int. Cl.

| | | |
|---|---|---|
| *B64U 50/23* | (2023.01) | |
| *F16D 11/00* | (2006.01) | |
| *F16D 11/14* | (2006.01) | |
| *F16D 23/12* | (2006.01) | |
| *F16D 23/14* | (2006.01) | |

(52) U.S. Cl.
CPC .. *F16D 2011/008* (2013.01); *F16D 2023/123* (2013.01); *F16D 2023/141* (2013.01)

(56) References Cited

OTHER PUBLICATIONS

Written Opinion of the ISA for PCT/IL2023/050342 mailed Aug. 28, 2023, 6 pages.

The original STAR—D. Zarrouk, A. Pullin, N. J. Kohut, and R. S. Fearing, "STAR—Sprawl Tuned Autonomous Robot," IEEE Int. Conf. on Robotics and Automation, 2013, pp. 20-25.

The reconfigurable RSTAR—D. Zarrouk, and L. Yeheskel, "Rising STAR, a highly reconfigurable sprawl tuned autonomous robot," IEEE, Robotics and Automation Letters. vol. 3, No. 3, 2014, pp. 1888-1895.

The Amphibious amphiSTAR—A. Cohen, and D. Zarrouk, "The AmphiSTAR high speed amphibious sprawl tuned robot, design and Experiments," IEEE Int. Conf. on Intelligent Robots and Systems, 2020, pp. 6411-6418.

The flying-driving FSTAR—N. Meiri, and D. Zarrouk, "Flying STAR, a hybrid crawling and flying sprawl tuned robot," IEEE Int. Conf. on Robotics and Automation, 2019, pp. 5302-5308.

The hybrid flying anc climbing FCSTAR—N. Ben David and D. Zarrouk,"Design and Analysis of FCSTAR, a Hybrid Flying and Climbing Sprawl Tuned Robot," IEEE Robot. Autom. Lett., vol. 6, No. 4, 2021, pp. 6188-6195.

A. Kalantari and M. Spenko, "Design and experimental validation of HyTAQ, a Hybrid Terrestrial and Aerial Quadrotor," IEEE International Conference on Robotics and Automation, Karlsruhe, 2013, pp. 4445-4450.

M. Yamada, M. Nakao, Y. Hada and N. Sawasaki, "Development and field test of novel two-wheeled UAV for bridge inspections," 2017 International Conference on Unmanned Aircraft Systems (ICUAS), 2017, pp. 1014-1021.

K. Tanaka et al., "A design of a small mobile robot with a hybrid locomotion mechanism of wheels and multi-rotors," IEEE International Conference on Mechatronics and Automation, 2017, pp. 1503-1508.

C. J. Salaan, K. Tadakuma, Y. Okada, Y. Sakai, K. Ohno, and S. Tadokoro, "Development and experimental validation of aerial vehicle with passive rotating shell on each rotor," IEEE, Robotics and Automation Letters. vol. 4, No. 3, 2019, pp. 2568-2575.

J. R. Page, P. E. I. Pounds, "The Quadroller: Modeling of a UAV/UGV hybrid quadrotor," IEEE Int. Conf. on Intelligent Robots and Systems, 2014, pp. 4834-4841.

Y. Mulgaonkar, B. Araki, J. S. Koh, L. Guerrero-Bonilla, D. M. Aukes, A. Makineni, V. Kumar, "The flying monkey: A mesoscale robot that can run, fly, and grasp," IEEE Int. Conf. on Robotics and Automation, 2016, pp. 4672-4679.

B. Araki, J. Strang, S. Pohorecky, C. Qiu, T. Naegeli, and D. Rus, "Multi-robot path planning for a swarm of robots that can both fly and drive," IEEE Int. Conf. on Robotics and Automation, 2017, pp. 5575-5582.

S. Mintchev, D. Floreano, "A multi-modal hovering and terrestrial robot with adaptive morphology," in Proceedings of the 2nd International Symposium on Aerial Robotics (No. CONF), 2018, 6 pages.

* cited by examiner

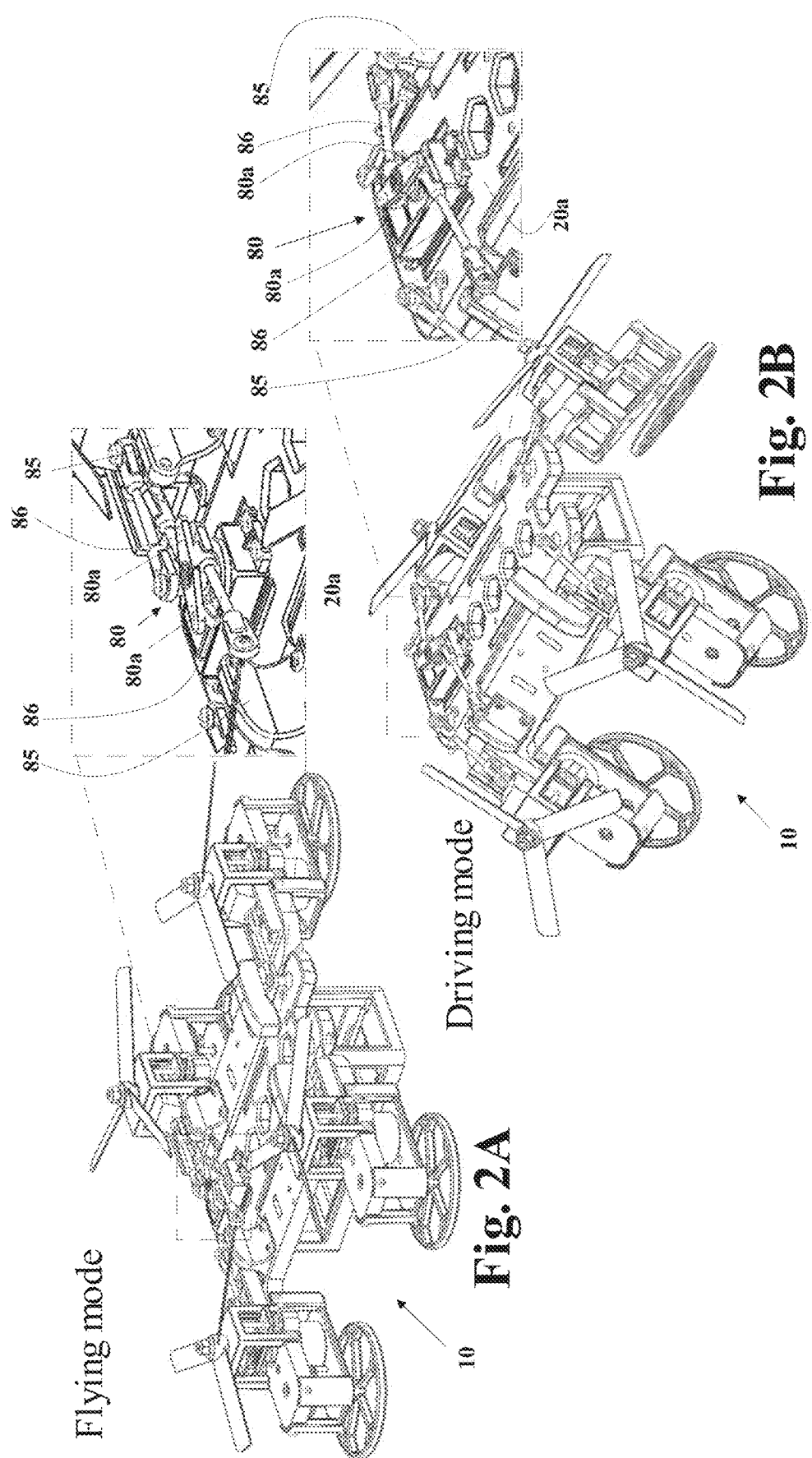

HYBRID FLYING DRIVING ROBOT WITH A CLUTCH MECHANISM FOR ENERGY EFFICIENCY

CROSS-REFERENCE TO RELATED APPLICATIONS

This application is the U.S. national phase of International Application No. PCT/IL2023/050342 filed Apr. 2, 2023 which designated the U.S. and claims priority to IL 291912 filed Apr. 3, 2022, the entire contents of each of which are hereby incorporated by reference.

FIELD OF THE INVENTION

The present invention relates to the field robotics. More particularly, the present invention relates to a mechanical Flying-driving robot with a sprawl mechanism in conjunction with a mechanical clutch mechanism for energy efficiency.

BACKGROUND OF THE INVENTION

Multiple miniature crawling robots designed to operate in unstructured environments for search and rescue, excavation, surveillance, security, and reconnaissance missions have been developed in the last few decades. Their small size, low weight and high maneuverability enable their deployment in large numbers, independently or in swarms, to scan large areas.

Considerable efforts have been made to reduce their size and energy consumption while increasing their speed. Some studies report exceptional locomotion performance, jumping, dynamic maneuvers, and running at speeds of up to 15 body lengths per second.

Examples of crawling robots include:

The original STAR—D. Zarrouk, A. Pullin, N. J. Kohut, and R. S. Fearing, "STAR—Sprawl Tuned Autonomous Robot," IEEE Int. Conf. on Robotics and Automation, pp. 20-25, 2013.

The reconfigurable RSTAR—D. Zarrouk, and L. Yeheskel, "Rising STAR, a highly reconfigurable sprawl tuned autonomous robot," IEEE, Robotics and Automation Letters. vol. 3, no. 3, pp. 1888-1895, 2014.

The Amphibious amphiSTAR—A. Cohen, and D. Zarrouk, "The AmphiSTAR high speed amphibious sprawl tuned robot, design and Experiments," IEEE Int. Conf. on Intelligent Robots and Systems, pp. 6411-6418, 2020.

WO 2019130303—Robot maneuverable by combined sprawl and four-bar extension mechanisms.

These 3D-printed wheeled robots, reconfigure their mechanics to engage in different terrains.

To overcome obstacles, multiple hybrid driving-flying robots have been developed:

The flying-driving FSTAR—N. Meiri, and D. Zarrouk, "Flying STAR, a hybrid crawling and flying sprawl tuned robot," IEEE Int. Conf. on Robotics and Automation, pp. 5302-5308, 2019.

The hybrid flying anc climbing FCSTAR—N. Ben David and D. Zarrouk, "Design and Analysis of FCSTAR, a Hybrid Flying and Climbing Sprawl Tuned Robot," IEEE Robot. Autom. Lett., vol. 6, no. 4, pp. 6188-6195, 2021.

Most robots rely on active propellers to enable their movement. For the following publications, the ground movement implements with a rolling cage-like frame or wheels that enable impressive maneuverability when rolling on the ground or climbing up walls:

A. Kalantari and M. Spenko, "Design and experimental validation of HyTAQ, a Hybrid Terrestrial and Aerial Quadrotor," IEEE International Conference on Robotics and Automation, Karlsruhe, pp. 4445-4450, 2013.

M. Yamada, M. Nakao, Y. Hada and N. Sawasaki, "Development and field test of novel two-wheeled UAV for bridge inspections," 2017 International Conference on Unmanned Aircraft Systems (ICUAS), pp. 1014-1021, 2017.

The publication—K. Tanaka et al., "A design of a small mobile robot with a hybrid locomotion mechanism of wheels and multi-rotors," IEEE International Conference on Mechatronics and Automation, pp. 1503-1508 2017—teaches of a developed UAV (unmanned aerial vehicle) with separate motors for wheels placed on each side of the drone.

The publication—C. J. Salaan, K. Tadakuma, Y. Okada, Y. Sakai, K. Ohno, and S. Tadokoro, "Development and experimental validation of aerial vehicle with passive rotating shell on each rotor," IEEE, Robotics and Automation Letters. vol. 4, no. 3, pp. 2568-2575, 2019—describes a UAV with a passive rotating shell on each rotor that not only enables it to roll on the ground or a roof, but also move along a vertical wall.

The publication—J. R. Page, P. E. I. Pounds, "The Quadroller: Modeling of a UAV/UGV hybrid quadrotor," IEEE Int. Conf. on Intelligent Robots and Systems, pp. 4834-4841, 2014—teaches of a developed flying drone that uses a unique design with entirely passive wheels for terrestrial locomotion.

The publications:

Y. Mulgaonkar, B. Araki, J. S. Koh, L. Guerrero-Bonilla, D. M. Aukes, A. Makineni, V. Kumar, "The flying monkey: A mesoscale robot that can run, fly, and grasp," IEEE Int. Conf. on Robotics and Automation, pp. 4672-4679, 2016. and B. Araki, J. Strang, S. Pohorecky, C. Qiu, T. Naegeli, and D. Rus, "Multi-robot path planning for a swarm of robots that can both fly and drive," IEEE Int. Conf. on Robotics and Automation, pp. 5575-5582, 2017.

introduced the Flying Monkey, which relies on both actuated wheels, and/or a crawling leg mechanism.

The publication—S. Mintchev, D. Floreano, "A multimodal hovering and terrestrial robot with adaptive morphology," in Proceedings of the 2nd International Symposium on Aerial Robotics (No. CONF), 2018—presented a reconfigurable drone that can fold one arm on top of the other. Terrestrial locomotion is achieved using two wheels on each side of the drone.

Analysis of these hybrid vehicles strongly suggests that flying, while usually faster, consumes more energy than driving, especially over flat surfaces. Therefore, when speed is not a primary concern, it is more energy efficient, and hence more advantageous, to drive.

The aforementioned original STAR, the reconfigurable RSTAR, the flying-driving FSTAR, the amphibious AmphiSTAR, and the hybrid flying and climbing FCSTAR are multiple sprawl-tuned robots, all of which can change the sprawl angle of their arms to modify their size and dynamic behavior. The FSTAR robot uses its motors for both driving and flying, and exhibited excellent performance through a combination of its flying and driving capabilities when overcoming challenging terrains including driving at maximal speed of 2.6 m/s.

However there still is a need to provide an upgraded energy-efficient flying-driving robot device.

It is therefore an object of the present invention to provide a flying-driving robot having energy efficient capabilities and a related method thereto.

It is a further object of the present invention to provide a clutch mechanism within said robot structure for obtaining said energy efficiency.

Other objects and advantages of the present invention will become apparent as the description proceeds.

SUMMARY OF THE INVENTION

The present invention relates to a hybrid driving and flying robot device. The robot device comprises wheels for the driving and propellors for the flying. The robot device comprises a plurality of motors, each of which is configured to drive the rotation of a respective propeller and of a respective wheel. This structure provides a robot device with few actuators, as these actuators are utilized for driving the rotation of both a respective wheel for the vehicle driving and a respective propeller for the vehicle flying. Furthermore, the robot device comprises a clutch mechanism that can detach a respective item of said items from the respective motor that drives its rotation, thereby minimizing energy consumption and increasing operation working time and range between recharging cycles.

The preset invention clutch mechanism may separate and disconnect the propellers from the motors when driving. According to a preferred embodiment, the separation of the clutch mechanism is designed to occur passively when the robot device is sprawled (in driving mode) at a certain degree. Besides reducing energy consumption, the separation of the propellers enables higher ground speeds and more stable driving. The present invention sprawl feature is utilized to disconnect the propellers from the motors such that when the sprawl occurs the motors are moved further away from the robot main body portion and the propellers are disconnected.

The robot is a reconfigurable robot capable of flying and driving. The robot can be used for various tasks such as search and rescue, package deliveries, and industrial inspection where it is expected to implement both low speed flying and driving due to safety restrictions.

Compared to other flying driving robots, the present invention robot may be substantially smaller than most other designs, thus allowing it to crawl between and underneath obstacles. Its ability to decrease its width and height allows it to penetrate various pipes. The robot is also more energy-efficient and quieter than robots that use their propellers to advance on the ground. It is also more stable, less susceptible to disturbances, can drive more accurately, and climb over inclines.

The present invention relates to a hybrid flying and driving robot comprising:

a plurality of wheels;

a plurality of propellers;

a plurality of motors, each of which is configured to drive the rotation of a respective wheel of said plurality of wheels;

wherein each respective motor of said plurality of motors is connected to a respective propeller of said plurality of propellers by means of a respective gear arrangement; wherein each respective gear arrangement is rearrangeable between two configurations:

a) a first configuration wherein the respective motor is configured to drive the rotation of the respective propeller;

b) a second configuration wherein the respective motor does not (and cannot) drive the rotation of the respective propeller (even when actuated).

Preferably, the hybrid flying and driving robot comprises four wheels, four propellers and four motors.

Preferably, each of the respective gear arrangements comprises:

a bottom crown gear wherein the respective motor is configured to drive the rotation of said bottom crown gear;

a displaceable upper crown gear meshable with said bottom crown gear;

a shaft fixedly connected to the center of the respective propeller at one end and fixedly connected to the center of the upper crown gear at its other end;

wherein in the first configuration the upper crown gear is placed in a position such that the upper crown gear meshes with the bottom crown gear; and wherein in the second configuration the upper crown gear is placed in a position away from the bottom crown gear such that the upper crown gear does not mesh with the bottom crown gear.

Preferably, said robot comprises a displaceable surface above the upper crown gear;

wherein the upper crown gear is fixedly attached to said displaceable surface;

wherein said displaceable surface is configured to be pushed down by a fork element and configured to be pushed up by an elastic element.

Preferably, the elastic element is a spring.

Preferably, the elastic element is placed between the bottom of the displaceable surface and a respective surface;

wherein the fork element comprises a slanted sloping bottom surface;

wherein the displaceable surface comprises a ramp on its top;

wherein the slanted sloping bottom surface is engageable with the ramp such that when engaged:

a) the displaceable surface moves vertically downwards when the slanted sloping bottom surface moves towards the high end of the ramp; and b) the displaceable surface moves vertically upwards by means of the elastic element, when the slanted sloping bottom surface moves away from the high end of the ramp.

Preferably, the robot comprises:

a main body portion;

two side arms, each connected to a side of said main body portion;

two legs connected to each of the side arms;

wherein each leg comprises:

a respective motor of the motors;

a respective wheel of the wheels, connected at the bottom of the leg;

a respective propeller of the propellers, connected at the top of the leg.

Preferably, each of the two side arms is rotatable around an imaginary axis in the fore-aft direction of the robot.

Preferably, said robot comprises a sprawl motor connected to the main body portion, configured to rotate the two side arms around the imaginary axes.

Preferably, said robot comprises two arm rods, each connected between a respective arm and the sprawl motor, such that the spawl motor is configured to displace each arm rod in a direction substantially perpendicular to the fore-aft direction of said robot, thereby causing the rotation of the two side arms.

Preferably, the arm rods are connected to the sprawl motor by either a U-joint or spherical joint connection; and wherein the arm rods are connected to the arms by either a U-joint or spherical joint connection.

Preferably, each arm comprises a vertical surface protruding upwards therefrom;

wherein the arm rod is connected to said vertical surface.

Preferably, the sprawl motor is a servo motor.

Preferably, each of the respective gear arrangements comprises:

a bottom crown gear wherein the respective motor is configured to drive the rotation of said bottom crown gear;

a displaceable upper crown gear meshable with said bottom crown gear;

a shaft fixedly connected to the center of the respective propeller at one end and fixedly connected to the center of the upper crown gear at its other end;

wherein in the first configuration the upper crown gear is placed in a position such that the upper crown gear meshes with the bottom crown gear;

wherein in the second configuration the upper crown gear is placed in a position away from the bottom crown gear such that the upper crown gear does not mesh with the bottom crown gear;

wherein said robot comprises a displaceable surface above the upper crown gear;

wherein the upper crown gear is fixedly attached to said displaceable surface;

wherein said displaceable surface is configured to be pushed down by a fork element and configured to be pushed up by an elastic element;

wherein the elastic element is placed between the bottom of the displaceable surface and a respective surface;

wherein the fork element comprises a slanted sloping bottom surface;

wherein the displaceable surface comprises a ramp on its top;

wherein the slanted sloping bottom surface is engageable with the ramp such that when engaged:

a) the displaceable surface moves vertically downwards when the slanted sloping bottom surface moves towards the high end of the ramp; and b) the displaceable surface moves vertically upwards by means of the elastic element, when the slanted sloping bottom surface moves away from the high end of the ramp;

wherein said robot comprises four leg rods, each connecting between the main body portion and a respective fork element of said fork elements, such that said leg rods enable the fork elements to move in a direction substantially perpendicular to the fore-aft direction when the two side arms are rotated.

Preferably, the leg rods are connected to the main body portion by either a U-joint or spherical joint connection; and wherein the leg rods are each connected to a respective fork element by either a U-joint or spherical joint connection.

Preferably, each respective motor is configured to drive the rotation of the respective wheel by means of a gearbox.

Preferably, said robot comprises a control unit comprising a processor, connected to and configured to activate the plurality of motors and the sprawl motor.

The present invention relates to a system comprising:

a) the hybrid flying and driving robot as explained herein;

b) a remote-control configured to transmit instructions to activate one or more of said robot plurality of motors and sprawl motor.

Preferably, the hybrid flying and driving robot comprises a receiver connected to the control unit;

wherein the remote-control comprises a transmitter; and wherein said receiver is configured to receive the remote-control instructions transmitted by said transmitter to activate the one or more of said robot plurality of motors and sprawl motor.

Preferably, the robot main body portion comprises a top surface and a bottom surface wherein objects can be placed therebetween.

Preferably, the displaceable surface comprises a bearing placed within an opening in said displaceable surface, and wherein the upper crown gear is fixedly connected to a central interior aperture of said bearing.

The present invention relates to a clutch mechanism comprising:

A motor;

a bottom crown gear wherein said motor is configured to drive the rotation of said bottom crown gear;

a displaceable upper crown gear meshable with said bottom crown gear;

wherein in a first configuration the upper crown gear is placed in a position such that the upper crown gear meshes with the bottom crown gear; and wherein in a second configuration the upper crown gear is placed in a position away from the bottom crown gear such that the upper crown gear does not mesh with the bottom crown gear;

a shaft fixedly connected to a first drivable member at one end and fixedly connected to the center of the upper crown gear at its other end;

a displaceable surface above the upper crown gear;

wherein the upper crown gear is fixedly attached to said displaceable surface;

wherein said displaceable surface is configured to be pushed down by a fork element and configured to be pushed up by an elastic element;

wherein the elastic element is placed between the bottom of the displaceable surface and a respective surface;

wherein the fork element comprises a slanted sloping bottom surface;

wherein the displaceable surface comprises a ramp on its top;

wherein the slanted sloping bottom surface is engageable with the ramp such that when engaged:

a) the displaceable surface moves vertically downwards when the slanted sloping bottom surface moves towards the high end of the ramp; and b) the displaceable surface moves vertically upwards by means of the elastic element, when the slanted sloping bottom surface moves away from the high end of the ramp.

Preferably, the clutch mechanism further comprises a second drivable member;

wherein the motor is configured to drive the rotation of the second drivable member.

Preferably, the first drivable member is a propeller and the second drivable member is a wheel.

Preferably, the clutch mechanism further comprises a rod anchored at one end to a first surface and at its other end to the fork element;

wherein said fork element is placed on a second surface nearby to said first surface;

wherein one of said first and second surfaces is angularly displaceable in relation to the other such that:

a. when the angle between the two surfaces decreases, the fork element is displaced away from the ramp; and b. when the angle between the two surfaces increases, the fork element is displaced towards the ramp.

The present invention relates to a hybrid flying and driving robot comprising:

a plurality of wheels;

a plurality of propellers;

a plurality of motors, each of which is configured to drive the rotation of a respective wheel of said plurality of wheels;

wherein each respective motor of said plurality of motors is connected to a respective propeller of said plurality of propellers by means of a clutch mechanism;

wherein said clutch mechanism is rearrangeable between two positions:

a) a first position having a connected gear arrangement wherein the respective motor is configured to drive the rotation of the respective propeller;

b) a second position having a disconnected gear arrangement wherein the respective motor does not drive the rotation of the respective propeller.

The present invention relates to a hybrid flying and driving robot comprising a plurality of clutch mechanisms (e.g. four), each of which is a clutch mechanism as described herein.

Preferably, in each clutch mechanism, the wheel is positioned according to one of the following:

a. perpendicularly to the propeller;

b. parallel to the propeller;

c. having a sharp angle between said wheel and propeller.

Preferably, the driving robot further comprises a pushing and pulling motor (e.g. a Servo motor, a solenoid motor, a motor with a screw that that carries out a linier movement);

wherein said pushing and pulling motor is connected to each clutch mechanism fork element by means of a rod; and wherein said pushing and pulling motor is configured to displace each clutch mechanism fork element towards and away from its respective ramp.

BRIEF DESCRIPTION OF THE DRAWINGS

The present invention is illustrated by way of example in the accompanying drawings, in which similar references consistently indicate similar elements and in which:

FIGS. 2A-2B show an enlargement of the spawl motor according to an embodiment of the present invention.

DETAILED DESCRIPTION OF THE INVENTION

Figure 1A:
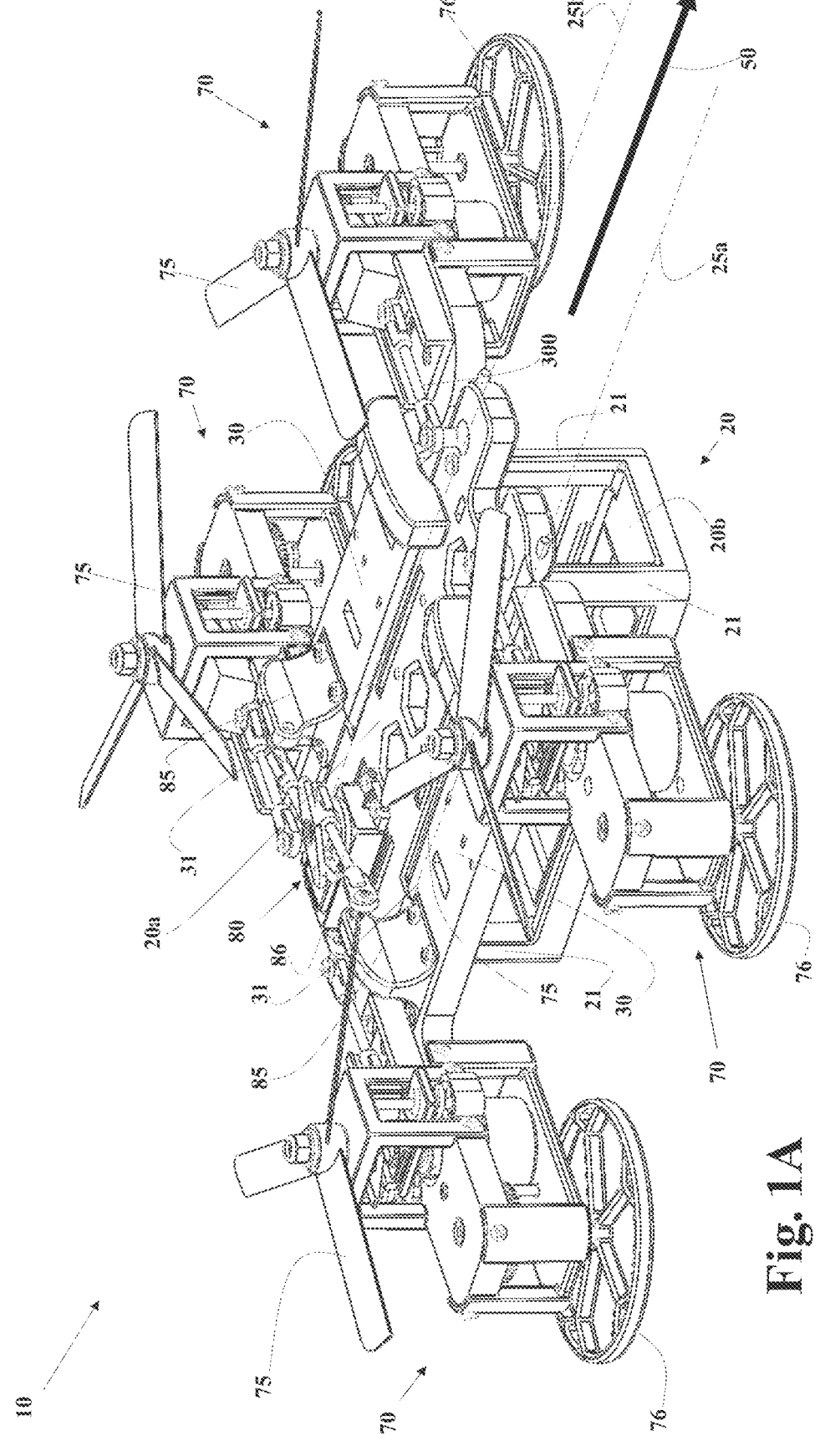
FIG. 1A illustrates an embodiment of the present invention robot in flying mode.

The present invention relates to a flying-driving robot having propellers for flying and wheels for driving. The robot comprises a plurality of motors for driving the wheels and propellers such that each respective motor drives a corresponding wheel along with a corresponding propeller. This provides an efficient device that necessitates only a few motors and utilizes a respective motor for more than one task, thereby providing multi tasks with few actuators. The present invention robot comprises a clutch mechanism associated with each motor, that separates the motor driving means from the propellers when the robot is in its driving mode, while still providing driving means to spin the wheels. This clutch mechanism increases the stability and driving speed of the robot and reduces its energy consumption and noise generated by the propellers, while driving.

Unlike some prior art hybrid flying driving robots which rely on their propellers to drive, or use a new set of motors to drive the wheels (in addition to the motors that drive the propellers), the present invention employs the same motors for flying and driving by using active wheels. This structure is advantageous when driving and results in a more compact design.

The present invention exploits its flying and driving capabilities to optimize its energy consumption (reducing its normalized energy cost). Experiments show that the clutch mechanism can reduce the driving energy consumption by 52% (for example) and enables driving at higher speeds. The present invention structure enables driving which can be almost three times more energy efficient at the considered speed, than flying. Accordingly, the driving is more energy-efficient, produces lower noise, is more stable and can achieve much faster ground speeds. Furthermore, the robot can produce a larger ground thrust that enables it to drive upwards over inclines.

According to one aspect of the present invention, the robot is highly reconfigurable and has sprawling capabilities, wherein the clutch mechanism is passively activated by a sprawl mechanism. The present invention robot comprises a main body portion with two side arms aligned in parallel to the longitudinal axis of the robot. A front leg and rear leg are attached to each of the side arms. Each leg comprises a propeller on its upper side (when the arms are parallel to the main body portion in flight mode) and a wheel on its bottom side (when the arms are parallel to the main body portion in flight mode). The robot may be in a form of a flying quadcopter when the arms are parallel to the main body portion in flight mode (i.e., when the sprawl angle is zero) and like a driving vehicle when the arms are lowered and thereby the wheels engage the ground enabling driving.

The sprawl mechanism includes the two side arms, each being tiltable around a corresponding rotation axis parallel to the longitudinal axis of the main body portion, such that the two arms of the robot are symmetrically and simultaneously tilted downwards, i.e., symmetrically and simultaneously lowered relative to the main body portion. The range of the sprawl angle ρ is from zero degrees, where the arms are parallel to the body in flight mode, to less than 90 degrees (e.g., 50 degrees or 48 degrees) when the robot is in driving mode.

When the side arms are tilted downwards simultaneously exceeding a certain angle, the gears of a clutch assembly are disconnected. Accordingly, the motor continues to drive the wheels but ceases to drive the propellers. When the side arms are tilted upwards simultaneously (in relation to the main body portion) and return to a sprawl angle ρ less than the disconnecting angle, the gears of the clutch assembly are reconnected, and the motor continues to drive the wheels along with the propellers.

It should be understood herein that the front-rear directions of the robot correspond to the fore-aft directions respectively and also correspond to the distal-proximal directions respectively, and all may be used herein interchangeably.

Figure 1B:
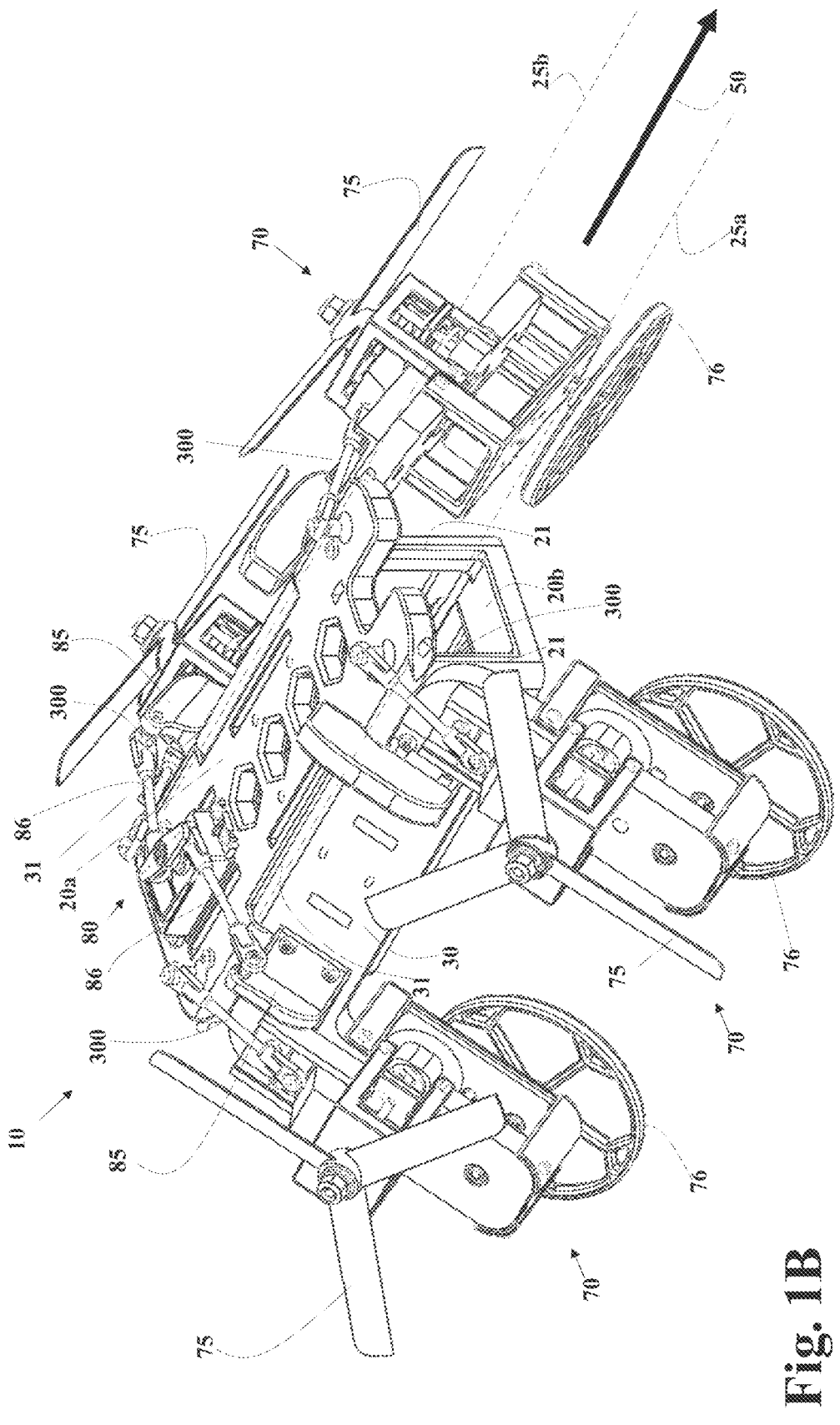
FIG. 1B illustrates an embodiment of the present invention robot in driving mode.

FIG. 1A shows a preferable embodiment of the present invention with the hybrid flying driving robot 10 in its flight mode configuration. FIG. 1B shows the preferable embodiment of the present invention with the hybrid flying driving robot 10 in its driving mode configuration. Robot 10 comprises a main body portion 20 with two side arms 30 aligned in parallel to the longitudinal axis of the robot. Arrow 50 (shown in FIGS. 1A and 1B) points to the front/fore/distal direction (and is parallel to the robot device longitudinal axis).

Each one of the side arms 30 is substantially positioned in the robot device fore-aft direction. Each one of the elongated arms 30 is rotatable around a corresponding parallel imaginary axis (25a and 25b). The imaginary axes 25a and 25b are parallel to each other (each positioned along the fore-aft direction of robot 10).

The main portion 20 comprises housing surfaces that are configured to house and protect inner components of robot device 10 mountable therein and possibly house payloads to be carried (wherein these payloads may be required to perform search and rescue missions including, for example, cameras, communication equipment and sensors. The housing surfaces include a top housing surface 20a and a bottom housing surface 20b. The main body portion may be in the form of a cuboid. It may further comprise a front face surface, a rear face surface, a left face surface and a right face surface. The main portion 20 in FIGS. 1A and 1B show the top housing surface 20a connected to the bottom housing surface 20b by means of four vertical bars 21, connecting between corresponding corners of the substantially cuboid shape (the corresponding corners that form a vertical connection). The housing may optionally be in other shapes. Objects may be placed within the main body portion (e.g., such as packages for delivery).

Preferably, the side arms 30 are in the forms of elongated plates (e.g., rectangular). The side arms 30 are connected to the main body portion 20 top housing surface 20a. Each side arm 30 comprises a protruding surface portion 31 that protrudes sideways. The top housing surface 20a comprises two side elongated recesses that are preferably complementary to the protruding surface portions 31. The recesses are bounded by a front surface and a rear surface (not shown). These front and rear surfaces (typically parallel thereto) each comprise an aperture (not shown). Each protruding surface portion 31 comprises an inner bore (not shown). An axis rod (not shown) is placed within the bore extending from both sides of the bore and inserted within each of the apertures (the front end of the rod placed in the corresponding front surface aperture and the rear end of the rod placed in the corresponding rear surface aperture). Thus, an "elongated hinge joint" is formed wherein each arm is tiltable/rotatable around the axis rod axis. Each of the axis rods coincides with a corresponding axis of the imaginary axes 25a and 25b.

The connection between the main body portion 20 and the side arms 30 may be in other similar forms, such as the top housing surface 20a having a protruding surface portion complementary to a corresponding recess within the arm 30 side, and with the bore within the protruding surface portion and rod inserted in the bore and in apertures at the front and rear surfaces of the recess (thereby forming the elongated hinge joint), as would be clear to a person skilled in the art, mutatis mutandis. Also, a front small rod and a rear small rod may replace the axis rod explained hereinabove, thereby achieving a similar joint, as would be clear to a person skilled in the art, mutatis mutandis.

Two legs 70 (a front leg and rear leg) are connected to each of the side arms 30, typically at the side arm 30 edges. Each leg 70 is connected to its respective side arm similarly. Each leg 70 comprises a propeller 75 connected to its top side (when the arms are parallel to the main body portion in flight mode) and a wheel 76 connected to its bottom side (when the arms are parallel to the main body portion in flight mode). It could be therefore understood according to FIG. 1B that when the robot 10 is in its driving/sprawl mode the propellers 75 are connected to the external side of a respective leg 70 (when in driving mode) and the wheels 76 are connected to the internal side of the respective leg 70 (when in driving mode).

The sprawl mechanism includes lowering and raising the arms 30 of the robot 10 in relation to the main body portion 20. The two arms 30 are symmetrically and simultaneously tilted downwards, i.e., symmetrically and simultaneously lowered relative to the main body portion. In fact, the main body portion is elevated when the sprawl angle ρ is increased, as the arms 30 inclines increase, because the closing of the arms raises the main body portion 20. The two arms 30 are symmetrically and simultaneously tilted upwards, i.e., symmetrically and simultaneously elevated relative to the main body portion and in fact, the main body portion is lowered when the sprawl angle ρ is decreased, as the arms 30 inclines decrease. Typically, when the sprawl angle ρ is zero the arm plates are parallel to the top housing surface 20a and the robot 10 bottom housing surface 20b rests on a ground surface that the robot 10 is placed on. When moving to driving mode, the arms 30 are simultaneously tilted downwards and the wheels 76 engage the ground surface that the robot 10 is placed on and the main body portion 20 elevates.

The sprawl mechanism causes the legs 70 (on a first arm 30 in relation to the legs 70 on the second arm 30) to move further apart or to come closer together (and thus elevate or lower the main body portion 20). When legs 70 engage the ground the sprawl power applied to move the legs is greater than the friction forces between the legs 70 and the ground.

The sprawl mechanism is actuated using a sprawl motor 80. According to a preferred embodiment, the sprawl motor 80 is a servo motor. According to other embodiments the sprawl motor may be a brushed motor with or without a gear box attached to an arm. The sprawl motor 80 is placed on the main body portion connected on top of the top housing surface 20a at an equal distance from the arms 30. The sprawl motor 80 is shown near the rear/proximal end of the robot 10 but can also be at a more distal position as long as it is on the longitudinal middle line of the top housing surface 20a at the same distance from both arms 30.

FIG. 2A shows an enlargement of the sprawl motor 80, when the robot 10 is in its flying mode. FIG. 2B shows an enlargement of the sprawl motor 80, when the robot 10 is in its driving mode. The sprawl motor 80 is configured to generate rotational movement and rotate a rotatable axle (not shown) extending therefrom (in this particular embodiment extending upwards therefrom) and the axle is fixedly connected to two aligned arms 80a extending substantially perpendicularly therefrom.

Each arm 30 comprises a vertical protruding surface 85 that typically protrudes upwards from the arm 30 top surface (when the robot 10 is in its flying mode), thereby being typically perpendicular to the arm top surface. The protruding surface 85 is also typically perpendicular to the longitudinal axis of robot 10.

The robot 10 comprises two connecting rods 86, each connected to a corresponding arm 80a by means of a U-joint or spherical joint (e.g. with a ball element connected from the corresponding arm 80a, e.g. extending downwards from arm 80a, and a casing element (casing the ball element) attached to the respective edge of the rod 86). For the sake of clarity, connecting rod 86 may also be referred to as arm rod 86. Each connecting rod 86 is connected at its other end by means of a U-joint or spherical joint to a respective protruding surface 85. This may be implemented by a ball element connected to a respective protruding surface 85 where the casing (casing the ball element) is attached to the respective rod 86 end. In case of the embodiment of a sprawl motor being a brushed motor with or without a gear box attached to an arm, the two connecting rods 86 may be each connected to a corresponding arm of said motor arms.

Accordingly, when the servo sprawl motor 80 is in the flying mode (as in FIG. 2A), the rods 86 are placed towards the longitudinal middle line of the top housing surface 20a. When the servo sprawl motor 80 is activated to transform the robot into the driving mode (as in FIG. 2B—in this particular case the arms 80a are turned clockwise), the rods 86 are placed away from the longitudinal middle line of the top housing surface 20a, thereby pushing the arms 30 and causing them to rotate downwards around the axes 25a and 25b respectively. When the servo motor 80 spins the arms 80a counterclockwise, the rods 86 are pulled towards the longitudinal middle line of the top housing surface 20a, thereby pulling and lifting the arms 30 to be horizontal.

Figure 2C:
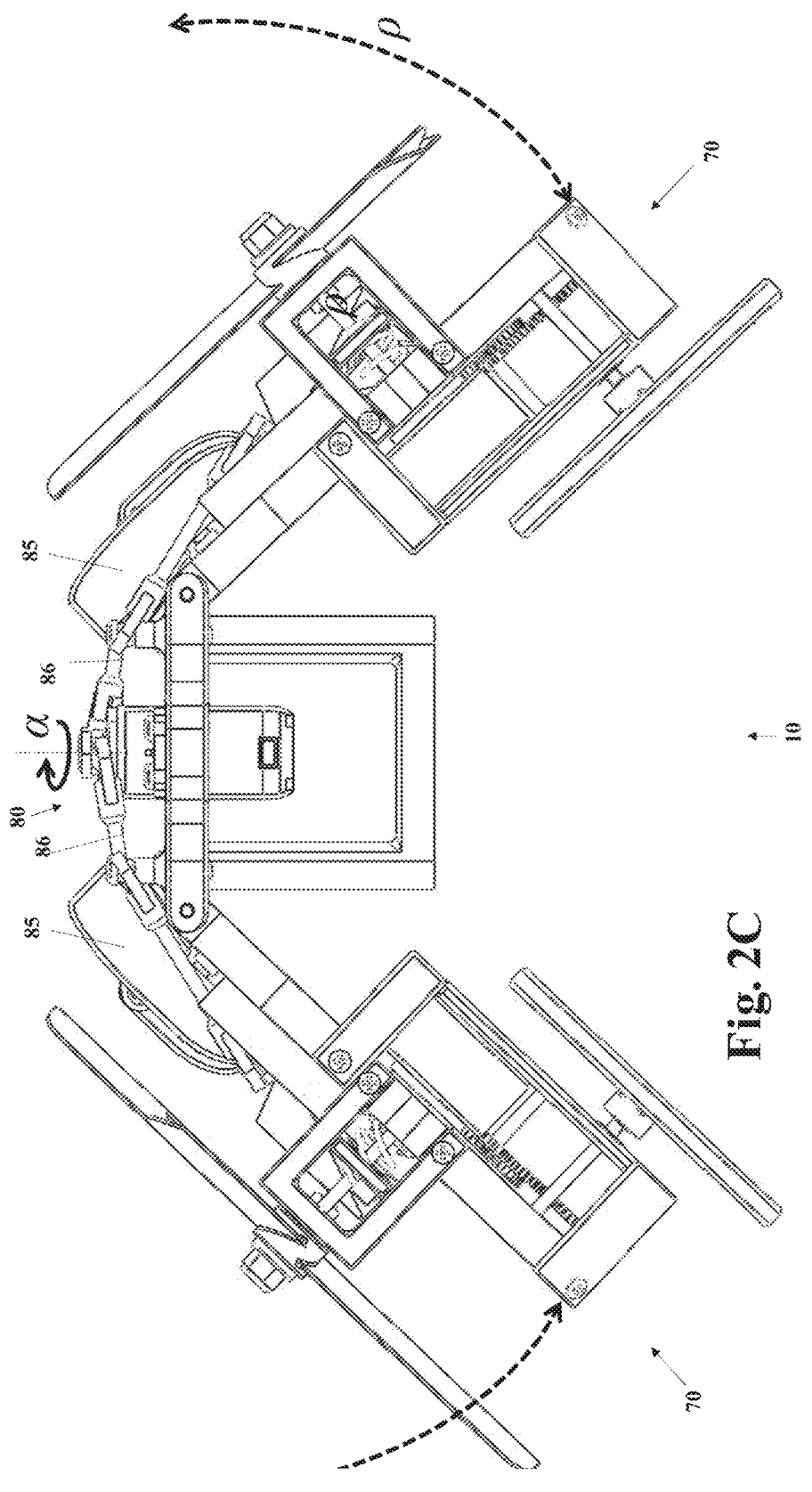
FIG. 2C shows a front view of the robot according to an embodiment of the present invention.

The sprawl angle, which can be varied allows the robot to increase/decrease its width and its height. FIG. 2C shows a front view of robot 10 where it could be shown, the relationship between the spinning angle α of the arms 80a of the sprawl motor 80 and the sprawl angle ρ. The sprawl angle ρ is symmetric, i.e., identical on each side arm. The range of the sprawl angle ρ is preferably from zero degrees, where the arms are parallel to the body in flight mode, to less than 90 degrees (e.g., 50 degrees) when the robot is in driving mode.

Figures 2D, 2E:
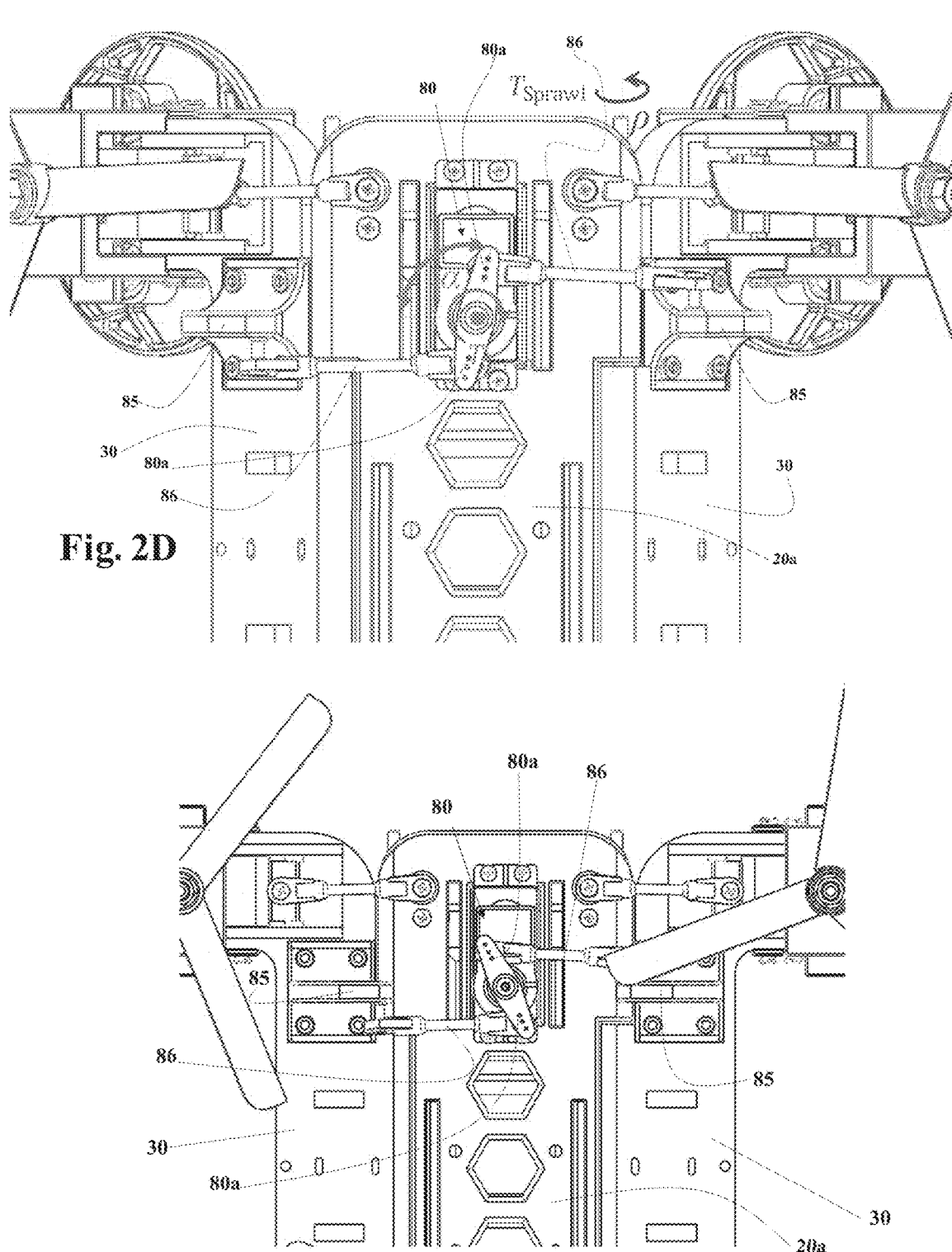
FIGS. 2D-2E show a top view of the robot with the spawl motor according to an embodiment of the present invention.

The robot device 10 sprawl mechanism stays in a constant position (e.g. lock position) and does not change the position of the arms 30 in relation to the main body portion 20 unless actuated by the motor 80 controlled by a control unit. Furthermore, the sprawl motor 80 either lifts both arms 30 at the same time (when activated in one direction) or lowers both arms 30 at the same time (when activated in the opposite direction) and to the same extent. FIG. 2D shows a top view of the spawl motor 80 in driving mode according to an embodiment of the present invention. FIG. 2E shows a top view of the spawl motor 80 in flying mode according to an embodiment of the present invention.

The sprawl mechanism is actuated using the servo motor and a three dimensional four-bar mechanism which relies on spherical joints. Preferably, the four-bar mechanism relies on two rotational joint and two spherical joints (or one U-joint and one spherical joint instead of the two spherical joints).

The clutch mechanism for the front legs and rear legs is similar for all legs and will be explained in relation to all of the legs 70. Furthermore, for the sake of brevity and clarity, the clutch mechanism will be explained in respect to the upper-lower direction when the robot 10 is in flight mode (i.e. horizontal), even though the leg 70 slants downwards in driving mode (i.e., the external direction of the leg 70 in driving mode corresponds to the upper direction in flying mode and the internal direction of the leg 70 in driving mode corresponds to the lower/bottom direction in flying mode). Accordingly, the propeller 75 is connected on to the top of the leg 70 and the wheel 76 to its bottom.

In general, for the sake of brevity and clarity, all elements of the robot 10 herein that are defined in respect to an upper-lower, top/bottom direction will be considered as the upper-lower direction when the robot 10 is in flight mode (i.e. horizontal). Even though the arm 30 and leg 70 (and portions thereof) slant downwards in driving mode it should be understood herein that the "external" direction of the arm 30 and leg 70 (and portions thereof) in driving mode correspond to the "upper" direction in flying mode and the "internal" direction of the arm 30 and leg 70 (and portions thereof) in driving mode correspond to the "lower/bottom" direction in flying mode. Therefore, it should be understood herein that if "element a" is defined as being above/on top of "element b" (as it is the case in flying mode) this definition will hold herein even if in a slanted configuration it would be observed as "element a" being on the external side of "element b" (or partially external due to the slant), and vice versa.

Figures 3A, 3B:
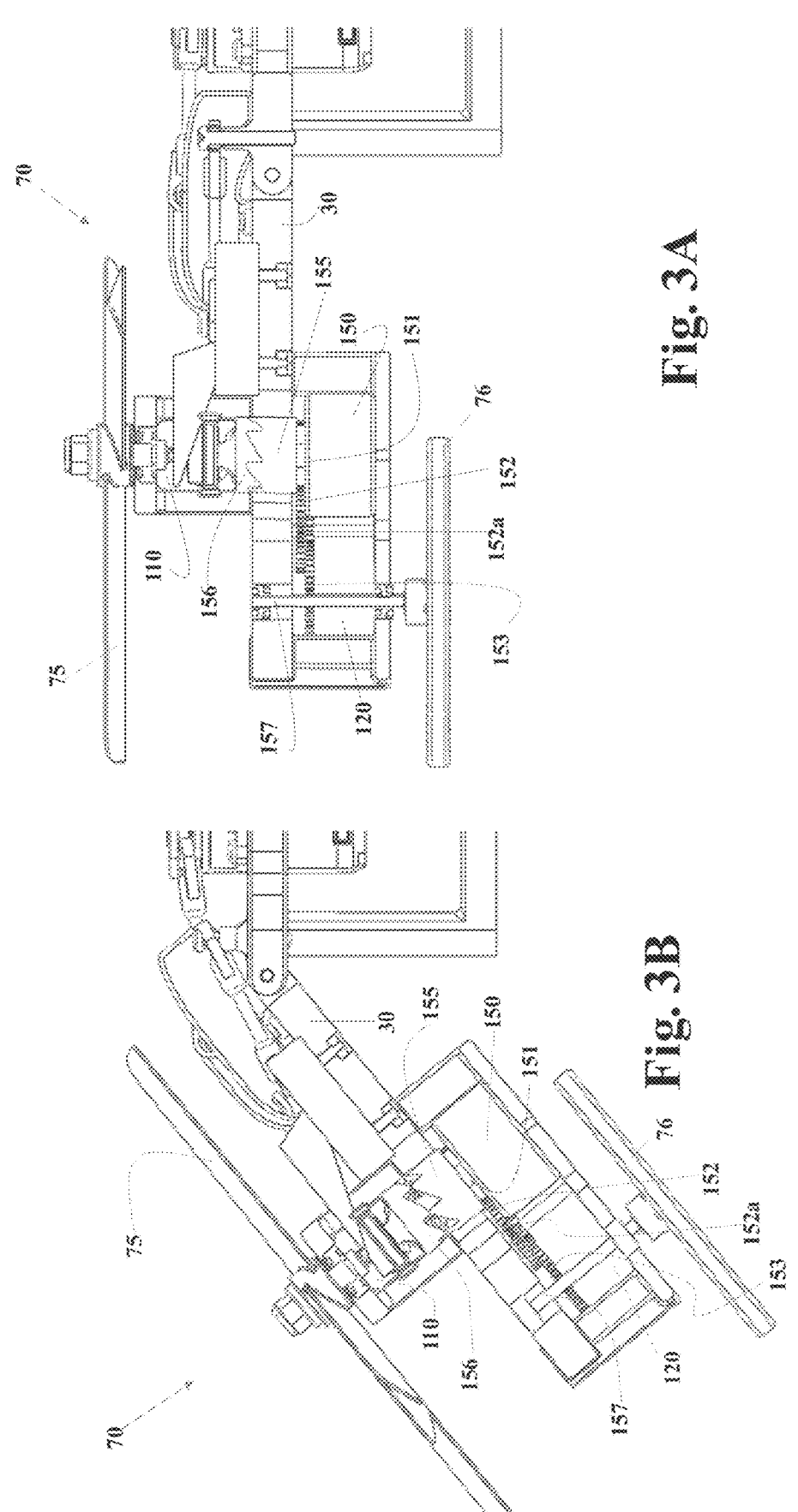
FIGS. 3A-3B show front views of the robot leg according to an embodiment of the present invention.

Each leg 70 comprises an upper chamber 110 and a bottom chamber 120, as shown in FIGS. 3A-3B. The propeller 75 is connected above the upper chamber 110 and the wheel 76 is connected beneath the lower chamber 120. Each leg comprises a motor 150 placed within the lower chamber 120. The motor 150 is configured to generate rotational movement and rotate a bottom crown gear element 155 (e.g.

by means of a rotatable axle (not shown) extending upwards therefrom and the axle is fixedly connected to the center of the bottom crown gear 155, such that the motor 150 causes the bottom crown gear to spin). The motor 150 is configured to drive the wheels 76 by means of a gearbox connected thereto. The motor 150 is placed on the side of chamber 120 that is near to arm 30, and beneath the upper chamber 110.

Preferably, the gearbox is a spur gear box comprising spur gears that mesh with each other. FIG. 3A shows an example where the motor 150 comprises a first spur gear 151 beneath the crown gear 155 (e.g. attached to the axle that extends from the motor 150 such that it spins in the similar manner (rotation speed) as the bottom crown gear 155). The first spur gear 151 meshes with a second spur gear 152. The second spur gear 152 has a third spur gear 152a beneath it (having the same rotational angular speed). The third spur gear 152a meshes with a fourth spur gear 153. An axle 157 passes in the middle of the fourth spur gear 153 and is fixedly attached thereto, such that the spur gear 153 is configured to spin the axle 157 accordingly. The axle 157 is placed at the side of chamber 120 that is farther from arm 30. The axle 157 is fixedly connected to the center of wheel 76 such that the axle 157 is configured to spin wheel 76 accordingly. The spur gearbox is such that the ratio between the spinning of the motor 150 and the spinning of the wheel 76 may be between, for example, 10:1 and 20:1 (a preferable example—14:1). The spur gearbox reduces the speed of the wheels 76 and increases the torque. The high ratio ensures high torque output and steady velocity. On the other hand, the ratio between the spinning of the motor 150 and the spinning of the propeller 75 is usually 1:1 (as will be explained herein).

Figure 4A:
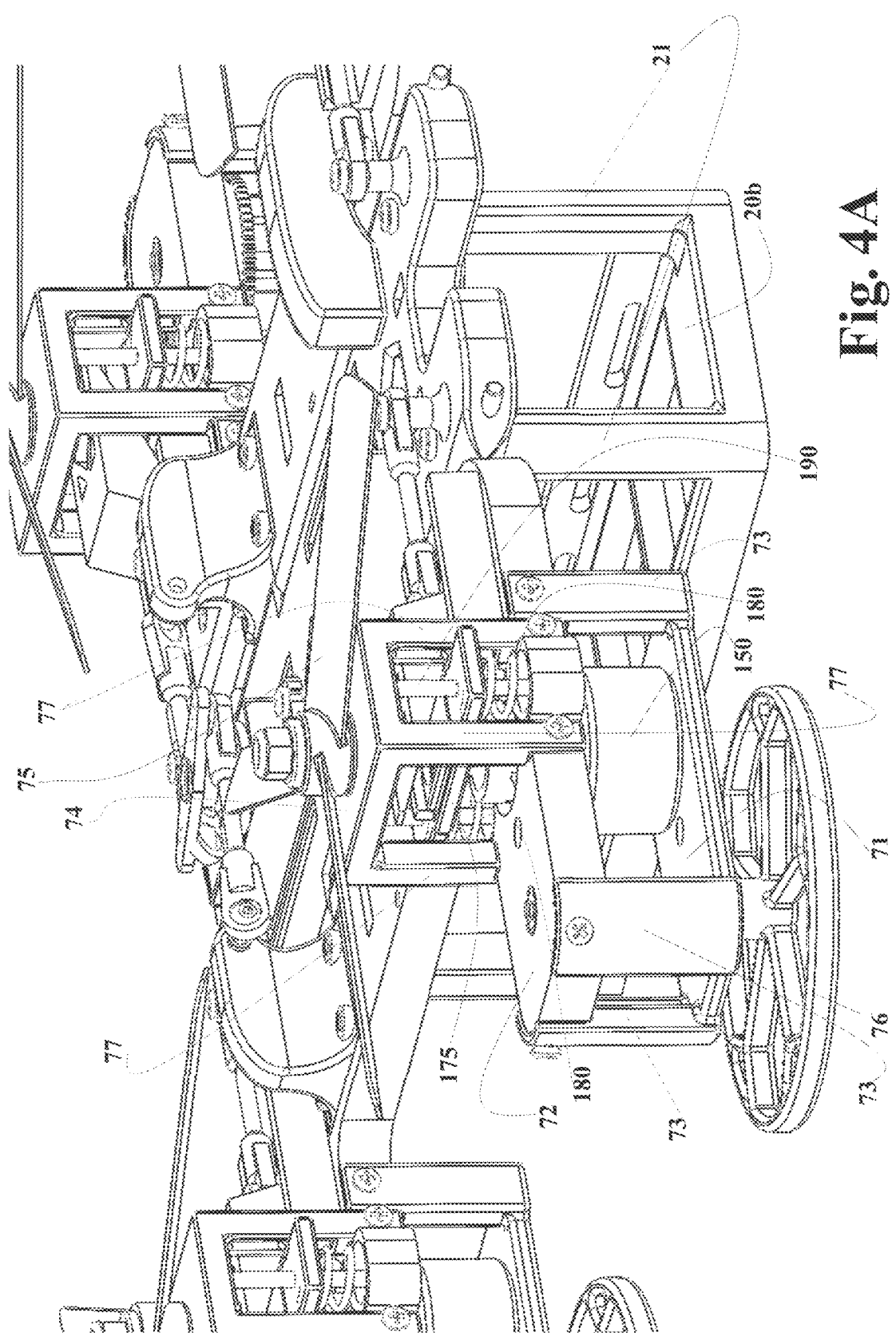
FIGS. 4A-4C show views of the robot leg according to an embodiment of the present invention.
Figure 4B:
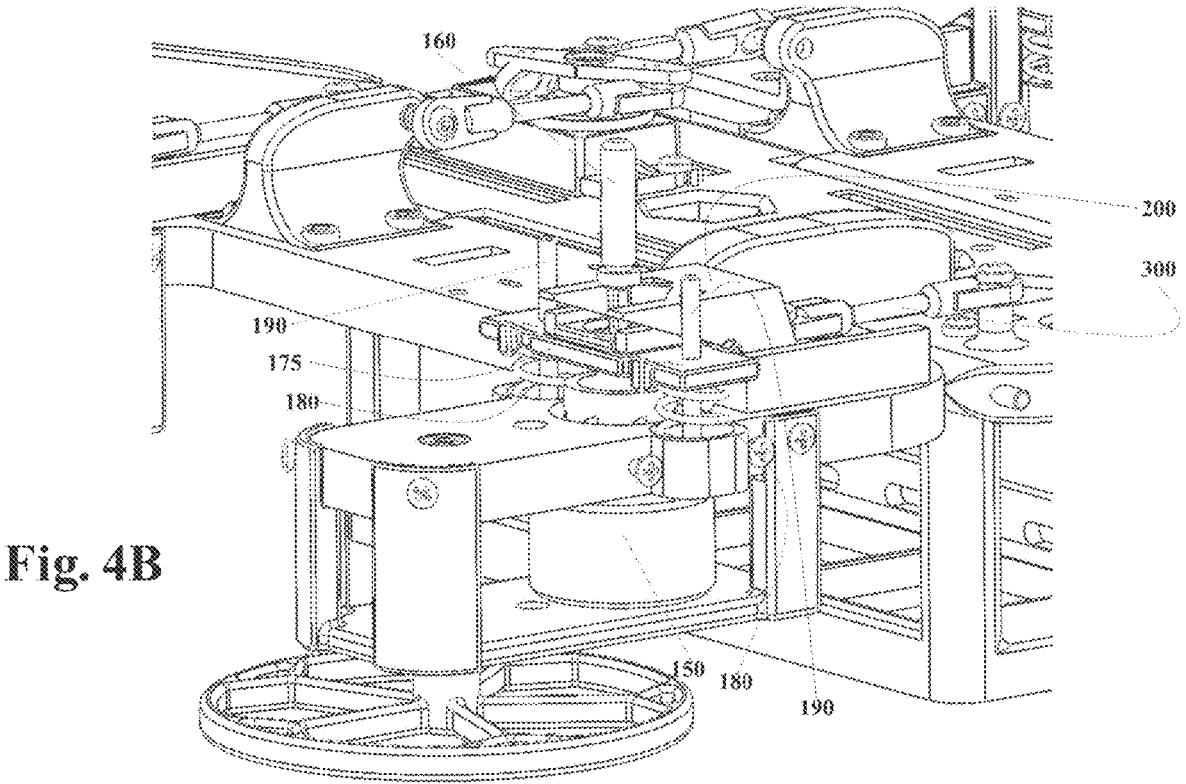
Figure 4C:
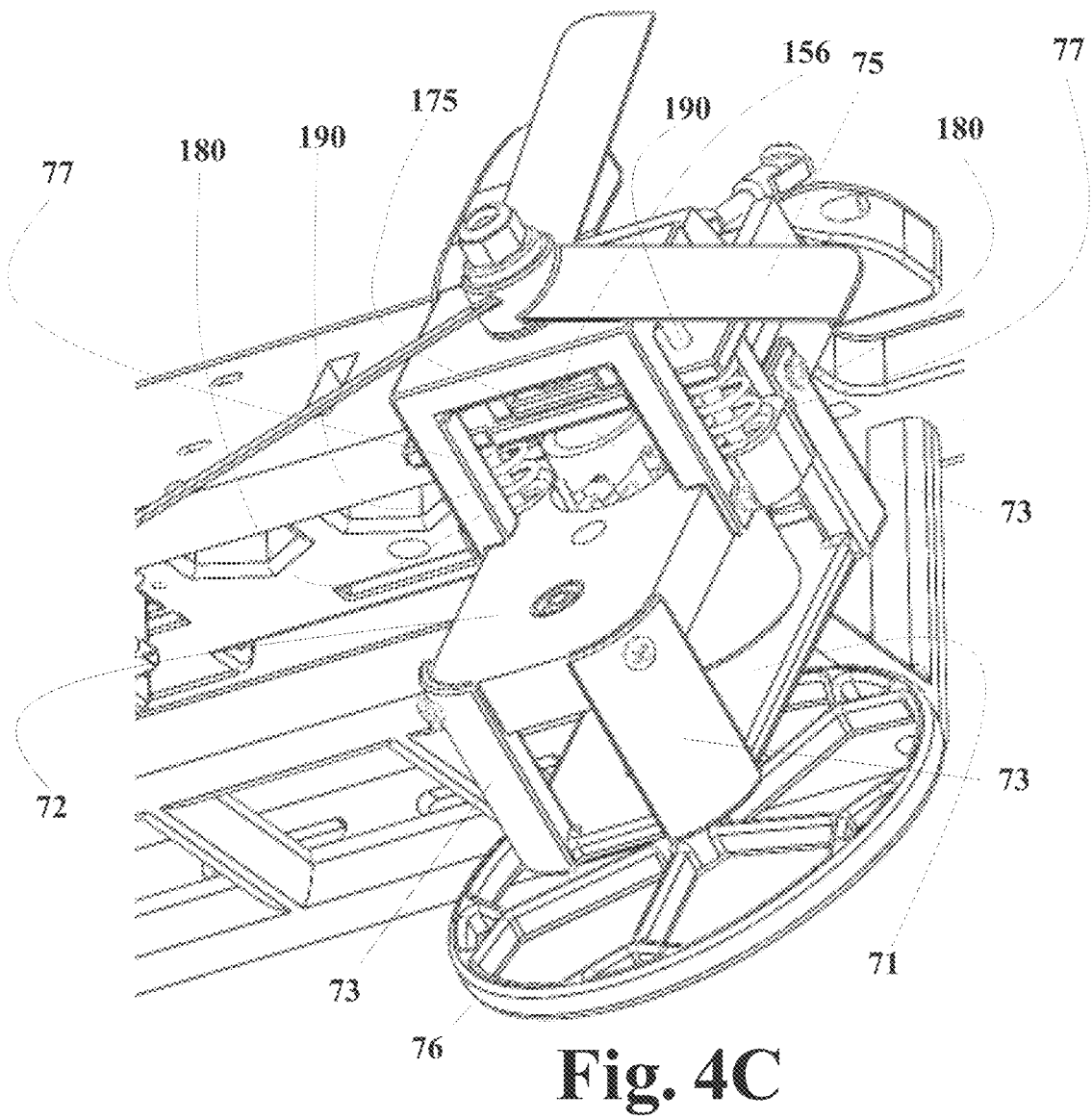

The lower chamber 120 is bounded by a bottom leg surface 71 from beneath and a middle leg surface 72 from above, as shown in FIGS. 4A-4C. The lower chamber 120 bottom leg surface 71 and the middle leg surface 72 are substantially rectangular. The lower chamber 120 bottom leg surface 71 is connected to the middle leg surface 72 by means of four vertical bars 73, connecting between corresponding corners of the rectangular surfaces 71 and 72 (vertical in the flying mode). The middle leg surface 72 is typically a continuation of the arm 30 surface extending sideways. The motor 150 is fixedly attached to the bottom leg surface 71.

The axle 157 is fixedly connected to the center of wheel 76 and passes through an appropriate aperture (not shown) in bottom leg surface 71.

The upper chamber 110 is bounded by the middle leg surface 72 from beneath and an upper leg surface 74 from above. The upper leg surface 74 is substantially rectangular. The upper leg surface 74 is connected to the middle leg surface 72 by means of four vertical bars 77 (vertical in the flying mode) connecting between the corners of leg surface 74 and surface 72. Upper chamber 110 is Typically adjacent to arm 30.

Figure 4D:
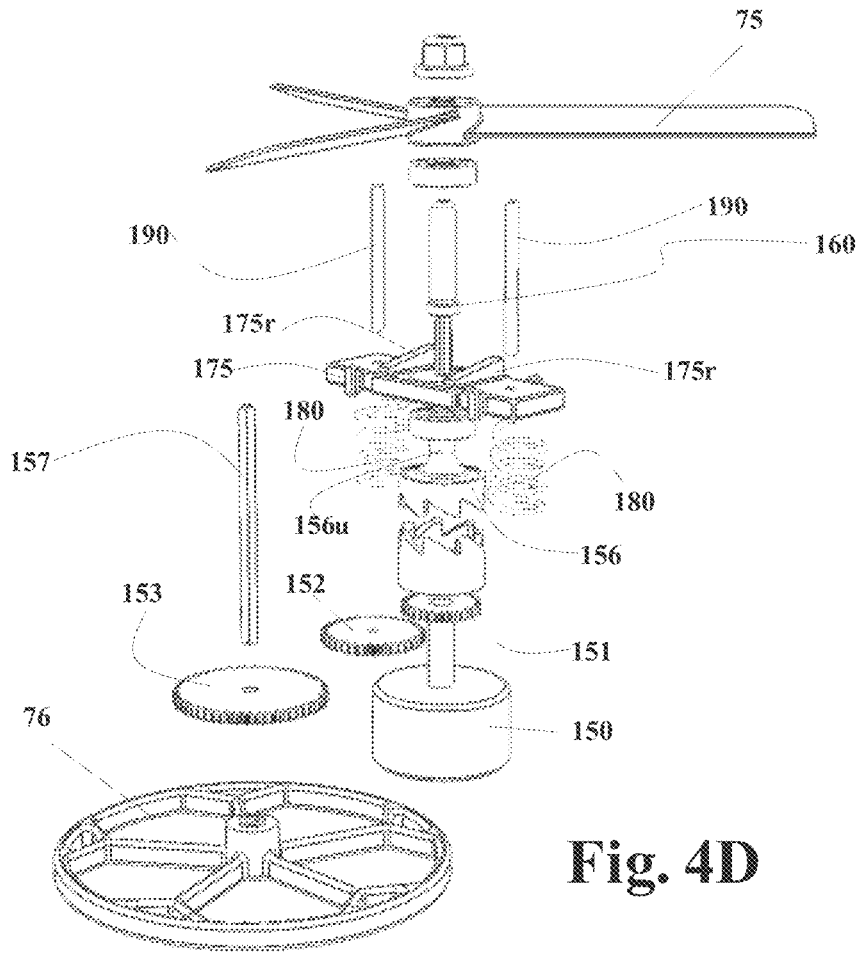
FIG. 4D shows an explosion view of the leg gear system according to an embodiment of the present invention.

For explanation, FIG. 4B is shown without upper leg surface 74 and without vertical bars 77. The clutch mechanism is based on a "one-way dog clutch" mechanism. The clutch mechanism comprises the bottom crown gear element 155 as explained herein and an upper crown gear element 156. As shown in explosion view in FIG. 4D, the bottom crown gear element 155 comprises teeth 155t (e.g., seven teeth) that extend upwards and corresponding recesses 155r therebetween and the upper crown gear element 156 comprises teeth 156t that extend downwards and corresponding recesses 156r therebetween. When brought together, the bottom crown gear element 155 teeth 155t are complementary to the upper crown gear element 156 recesses 156r and the upper crown gear element 156 teeth 156t are complementary to the bottom crown gear element 155 recesses 155r. When brought together, the bottom crown gear element 155 and the upper crown gear element 156 rotate together as a unit (as the respective teeth fill in the respective recesses). Optionally, the angles of the teeth are structured such that they are configured to allow angular motion in only one direction. The angles of teeth 155t, 156t (and recesses 155r, 156r) may vary according to preferred embodiments.

The bottom crown gear 155 passes through an opening in surface 72 (and upper crown gear 156 may also partially pass through said opening).

The upper crown gear element 156 comprises an upper tubular member 156u extending upwards therefrom (and placed above its center). A vertical rotating shaft 160 passes through the upper tubular member 156u. Both rotating shaft 160 and upper tubular member 156u having complementary shapes, such that the upper crown gear element 156 is configured to spin the rotating shaft 160 accordingly. The rotating shaft 160 is fixedly connected to the center of the propeller 75 such that the upper crown gear element 156 is configured to spin the propeller 75 accordingly (therefore, when motor 150 spins it spins bottom crown gear element 155 which spins the upper crown gear element 156 (which rotate together as a unit) which spins the propeller). Accordingly, the propeller 75 (when the gear elements 155 and 156 mesh and are connected) rotates according to the rotation of motor 150.

The upper tubular member 156u is inserted through a bearing 170 (e.g., a thrust bearing, a tapered roller bearing) and fixedly connected to the central interior aperture of the bearing 170. The bearing 170 is placed within an opening of a horizontal movable (displaceable) surface 175 that moves vertically (and fixedly attached to the opening of movable surface 175), such that when the movable surface 175 moves vertically upwards or downwards the bearing 170 and thus the upper tubular member 156u (and thus the entire upper crown gear element 156) move accordingly. The rotating shaft 160 passes through the upper tubular member 156u which is within the bearing 170 which is in the surface 175 opening. The upper tubular member 156u actually moves vertically (upwards or downwards) along a portion of the rotating shaft 160.

An elastic member (e.g. spring) is placed between the vertically movable surface 175 and the middle leg surface 72. FIG. 4A shows two side springs 180 at a proximal portion within chamber 110 and at a distal portion within chamber 110. Optionally, the springs 180 are placed within respective niches 181 within middle surface 72. Optionally, two rods 190 are fixedly placed each between a respective niche 181 and the upper leg surface 74 (passing through respective appropriate apertures within movable surface 175. The two rods 190 ensure that the movable surface 175 ascends and descends vertically while remaining parallel to the arm 30. Typically, the two rods 190 pass through the springs 180 that may contribute to the positioning of springs 180.

Figures 5A, 5B:
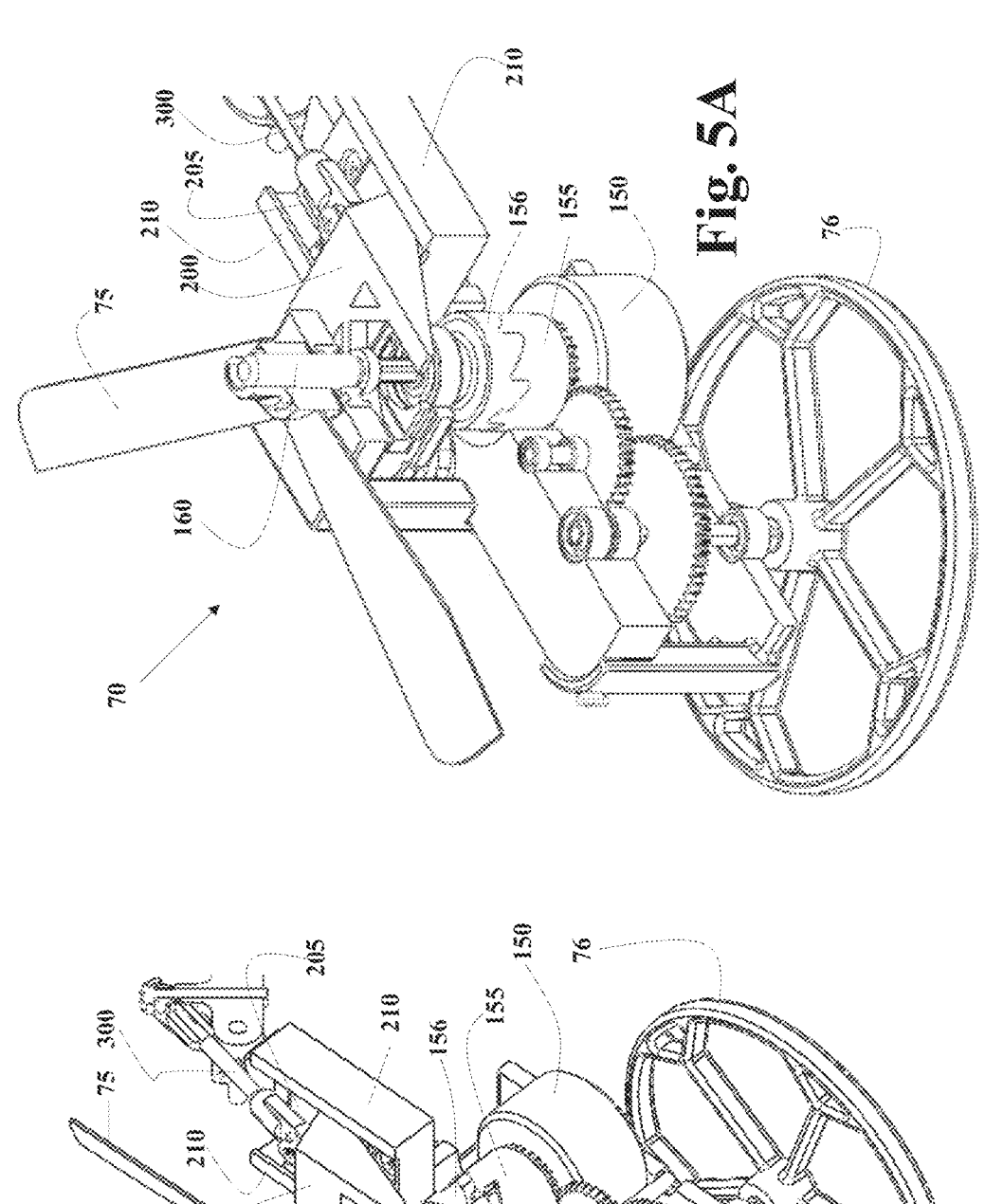
FIGS. 5A-5B show partial portions of the robot leg according to an embodiment of the present invention.

The clutch mechanism comprises a fork element 200 placed on the arm 30 and movable thereon in a direction perpendicular to the longitudinal axis of robot 10. Optionally, the fork element is movable along a track 205 bounded by two vertical surfaces 210 shown in FIGS. 5A and 5B which show the leg 70 without some elements for a better tangible understanding. The vertical surfaces 210 may have an inward elongated protrusion (not shown) placed above an outward elongated protrusion of the fork element 200 close to its bottom (not shown) to restrict the fork element 200 from moving vertically upwards. The fork element 200 may roll on small wheels at its bottom to reduce friction.

Figures 6, 7A, 7B, 7C, 7D:
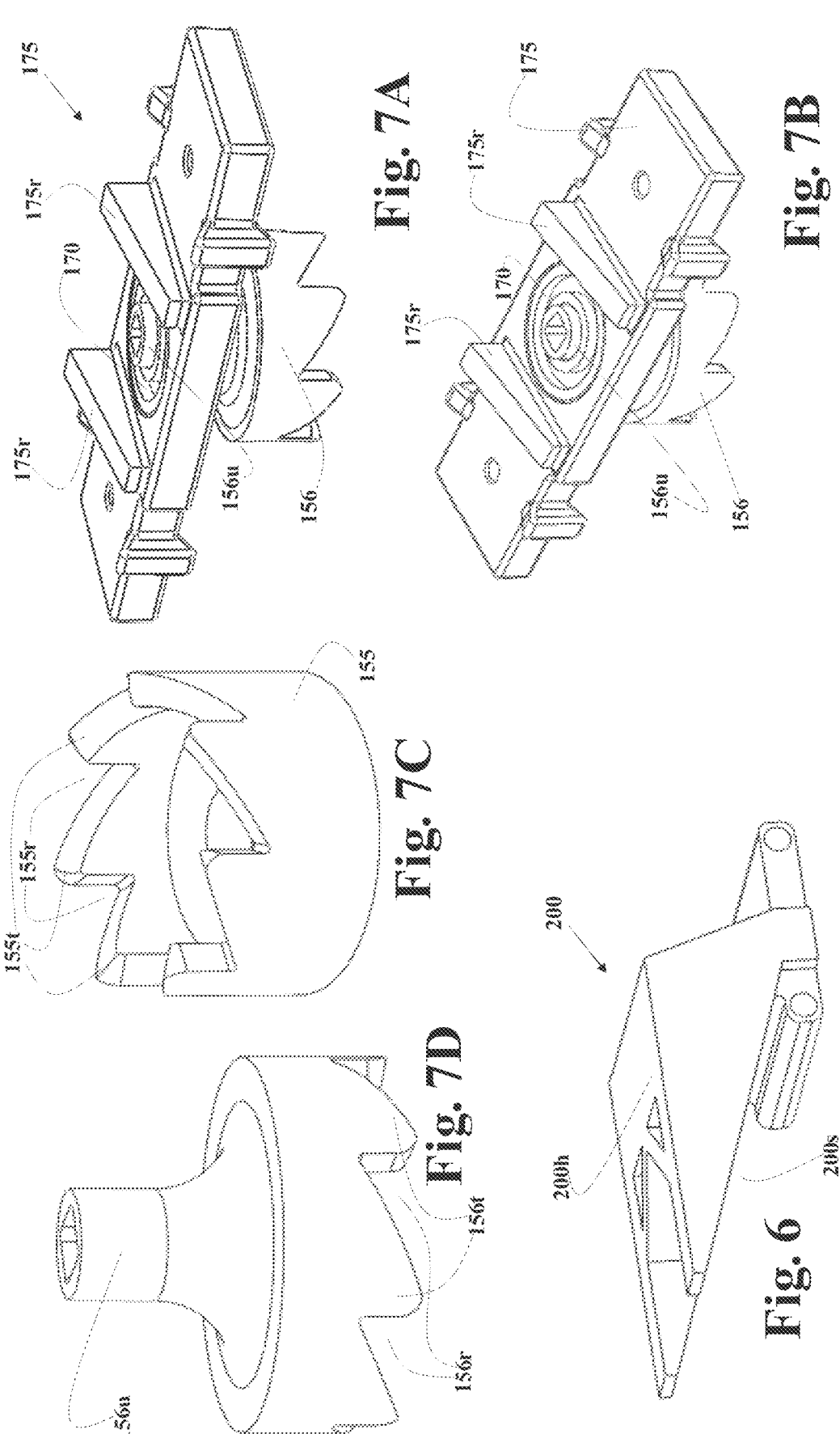
FIG. 6 shows the fork element according to an embodiment of the present invention.
FIGS. 7A-7B show the robot leg displaceable surface according to an embodiment of the present invention.
FIGS. 7C-7D show the robot crown gears according to an embodiment of the present invention.

The fork element 200 comprises a horizontal top surface 200*h* and a slanted sloping bottom surface 200*s* (shown in FIG. 6) sloping from its external side (the side farther away from main body portion 20) to an internal portion (forming a sharp angle cross section pointing/facing away from the main body portion 20). The movable surface 175 comprises a ramp portion 175*r* (shown in FIGS. 7A-7B) on its top (aligned perpendicularly to the longitudinal axis of robot 10). The ramp 175*r* slopes down such that the low end of the ramp 175*r* faces the side close to the main body portion and the high end of the ramp 175*r* is at the side away from the main body portion 20. The slanted sloping bottom surface 200*s* is engageable with the ramp 175*r*. FIG. 6 shows fork element 200 having two dedicated sloping bottom surfaces 200*s* configured to engage two respective ramps 175*r*. FIGS. 7A-7B show the displaceable surface 175. FIGS. 7C and 7D show an enlarged examples of elements 155 and 156 respectively.

Figures 8A, 8B:
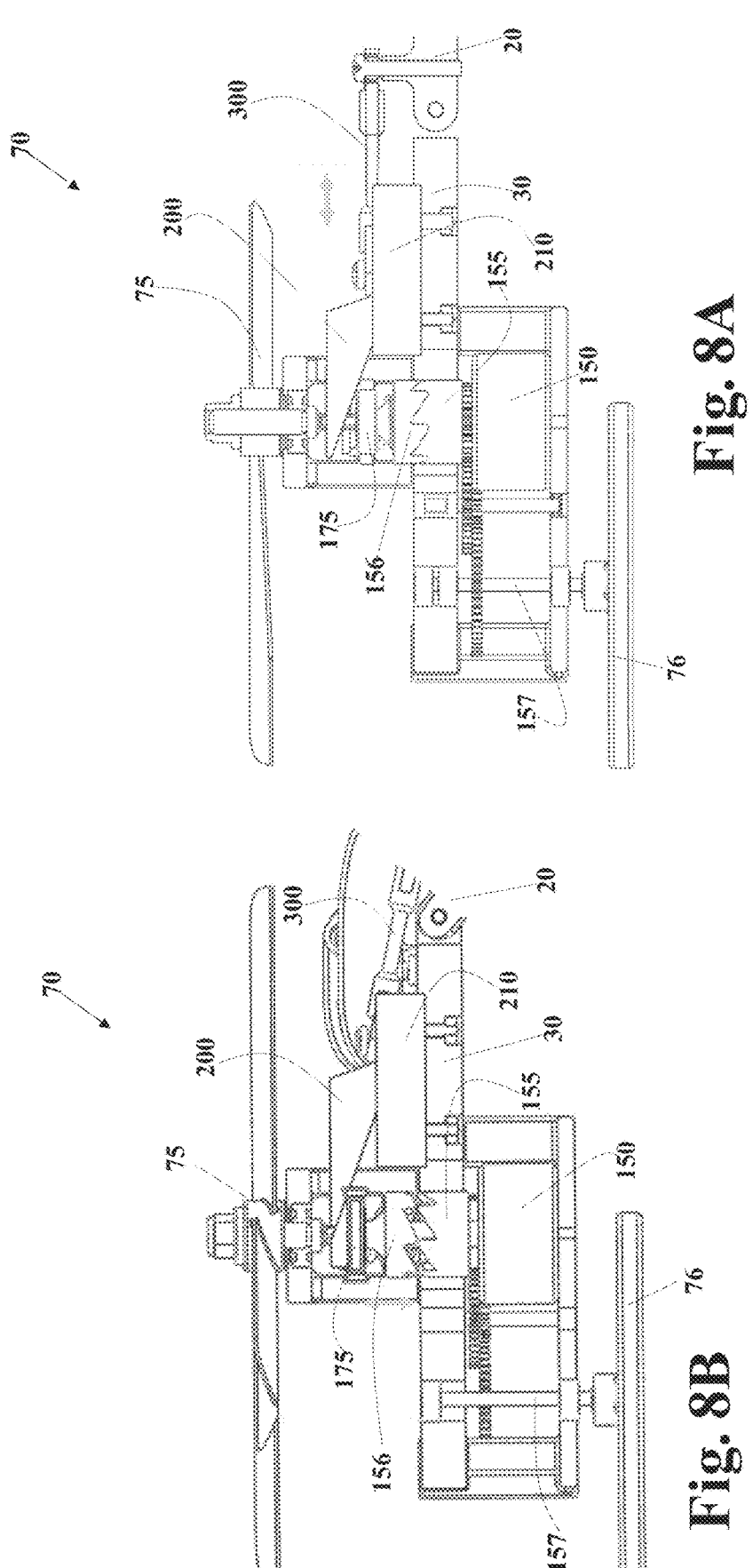
FIGS. 8A-8B show front views of the robot leg according to an embodiment of the present invention.

The robot 10 comprises four connecting push/pull rods 300, each connecting between the top housing surface 20*a* and a corresponding fork 200. For the sake of clarity, each rod 300 may also be referred to as leg rod 300. Front views of leg 70 are shown in FIGS. 8A (flying mode) and 8B (driving mode). The rods 300 are transversely aligned (perpendicularly to the longitudinal axis of the robot 10). The connection between each rod 300 and a corresponding fork 200 is by means of a U-joint or spherical joint (as explained similarly to rod 86 mutatis mutandis). Each push/pull rod 300 is connected at its other end to the corresponding fork 200 by means of a U-joint or spherical joint (as explained similarly to rod 86 mutatis mutandis).

When robot 10 is in flying mode, the fork 200 is placed in the most outward position, i.e., closest to the main body portion. In this state, the upper crown gear element 156 meshes with the bottom crown gear element 155 (which rotate together as a unit, when motor 150 is activated). When the sprawl mechanism is activated and the robot 10 transforms to its driving mode, the rod 300 actually pulls the fork 200 inwards in relation to the leg 70 which is lowered and moved farther away from the fork 200. This causes the fork 200 to move farther away from the ramp 175*r*. The springs 180 thereby push the movable surface 175 upwards and thus the upper crown gear element 156 moves away from the bottom crown gear element 155. As the distance that the movable surface 175 and upper crown gear element 156 move is according to the sprawl angle, at a certain angle (e.g. 50 degrees) the upper crown gear element 156 disengages completely from the bottom crown gear element 155. Accordingly, if the motor 150 is activated, only the bottom crown gear element 155 will spin and thus only the wheels 76 will spin and the propellers 75 will not spin. The movements of rod 300 and of fork 200 accordingly, are in the direction substantially perpendicular to the fore-aft direction. Fork 200 may comprise a back surface protruding from its bottom towards the main body portion, to which the rod 300 is connected to.

When the sprawl mechanism is activated and the robot 10 transforms back to its flying mode, the rod 300 actually pushes the fork 200 outwards in relation to the leg 70 which is elevated and moved closer to the fork 200. This causes the fork 200 to move closer to the ramp 175*r*. The engagement of surface 200*s* with the ramp 175*r* overpowers the springs 180 force thereby causing the movable surface 175 to move downwards and thus the upper crown gear element 156 moves towards the bottom crown gear element 155. As the distance that the movable surface 175 and upper crown gear element 156 move is according to the sprawl angle, at a certain angle the upper crown gear element 156 engages and meshes with the bottom crown gear element 155. Accordingly, if the motor 150 is activated, the bottom crown gear element 155 will spin along with the upper crown gear element 156 and thus the wheels 76 will spin along with the propellers 75. Thus, the sprawl mechanism is utilized to activate the clutch mechanism in a most efficient manner.

The wheels 76 rotate continuously and their rotation in flight mode consumes (according to a particular embodiment) nearly 4.5% of the robot's total power requirement energy.

Figure 9A:
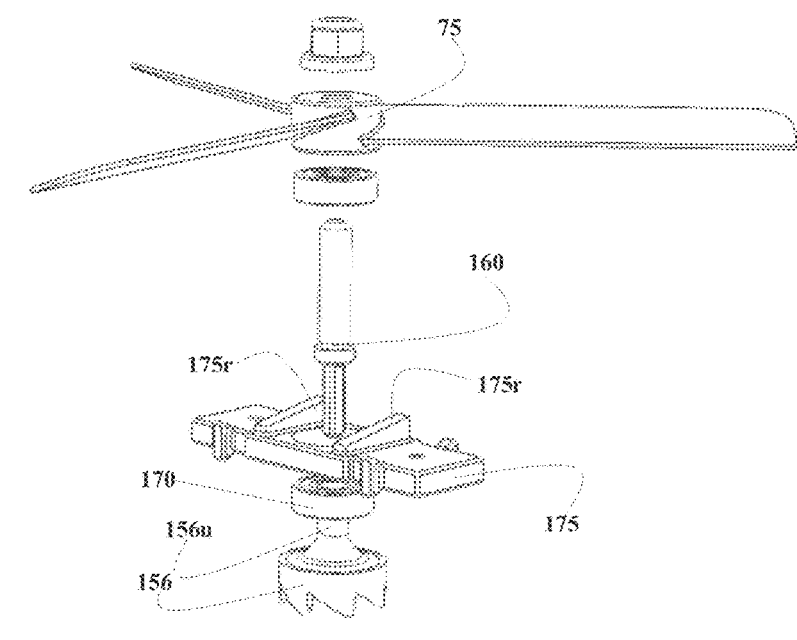
FIG. 9A shows an explosion view of the propeller according to an embodiment of the present invention.
Figure 9B:
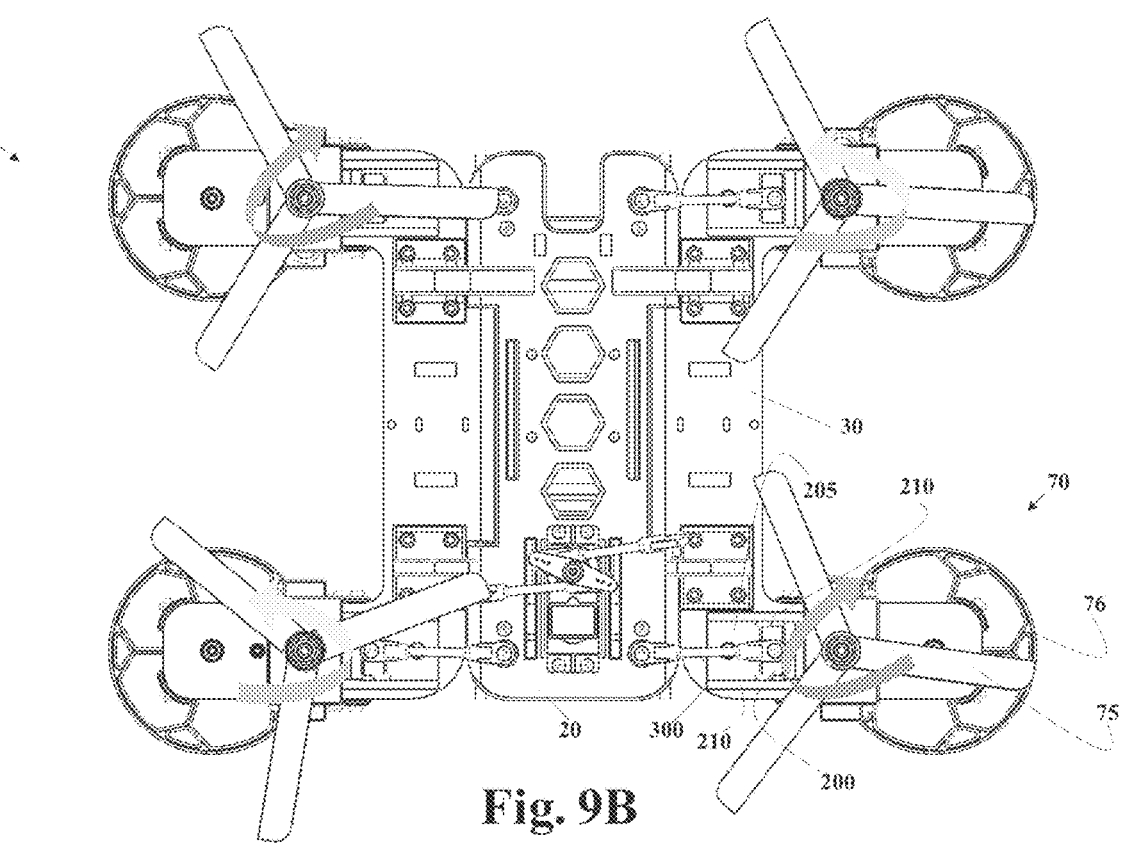
FIG. 9B shows a top view of the robot in flight mode according to an embodiment of the present invention.
Figure 9C:
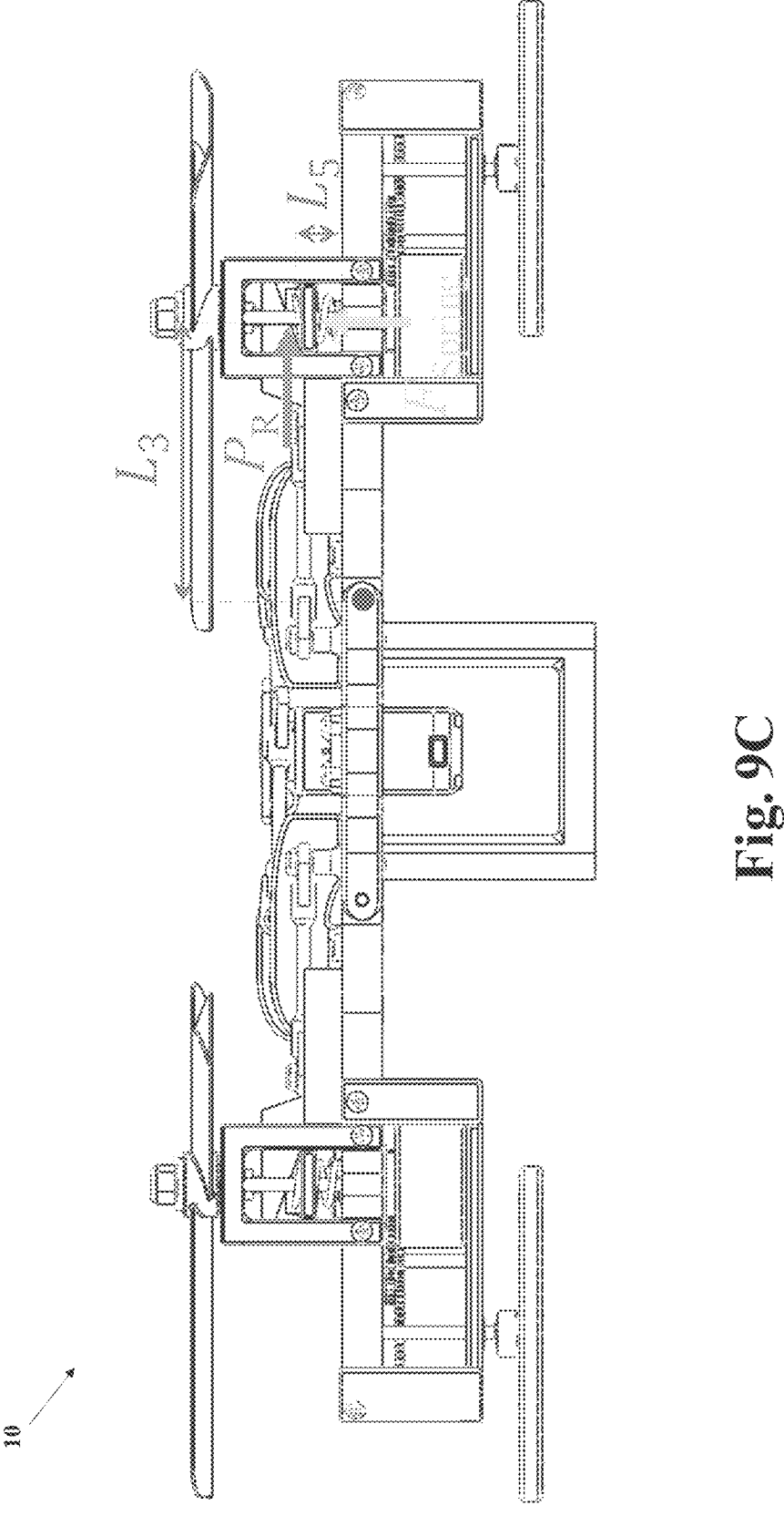
FIG. 9C shows a front view of the robot in flight mode according to an embodiment of the present invention.
Figure 9D:
FIG. 9D shows a front view of the robot in driving mode according to an embodiment of the present invention.

FIG. 9A shows an explosion view of the propeller 75 connection. FIG. 9B shows a top view of the robot 10 in flight mode. FIG. 9C shows a front view of the robot 10 in flight mode. FIG. 9D shows a front view of the robot 10 in driving mode.

According to another (second) aspect of the present invention, the clutch mechanism does not necessarily necessitate a sprawl mechanism for the clutch mechanism.

For example, the robot may be similar to robot 10 constantly in the flying mode, only with the wheels vertically aligned and perpendicular to the horizontal alignment of the propellers. The motor for each leg may have a gearbox accordingly to drive the wheels (always) and drive the propellers (when the clutch mechanism does not disconnect the propellers from function). For example, a clutch mechanism with a fork, similar to as described herein, is used. A servo motor does not sprawl the robot, but rather it is placed in the center of the main body portion and connected to all four legs' fork elements (e.g., by respective rods) such that at one servo motor position the fork is pushed away from the servo motor and connects the upper crown gear to the bottom crown gear, thereby being in flying mode activating the propellers, as explained herein mutatis mutandis. When changing to be in driving mode, the servo motor pulls the forks closer to it and the clutch mechanism as explained herein (with the springs etc.) disconnects the upper crown gear from the bottom crown gear, thereby the propellers don't rotate, only the wheels rotate, thereby being in driving mode. When changing again to be in flying mode, The servo motor causes pushing the rods/forks to reconnect the crown gear elements to return to flying mode, etc. similarly to as explained herein, mutatis mutandis. Other elements as explained herein may be adapted to this structure, mutatis mutandis.

Figure 15:
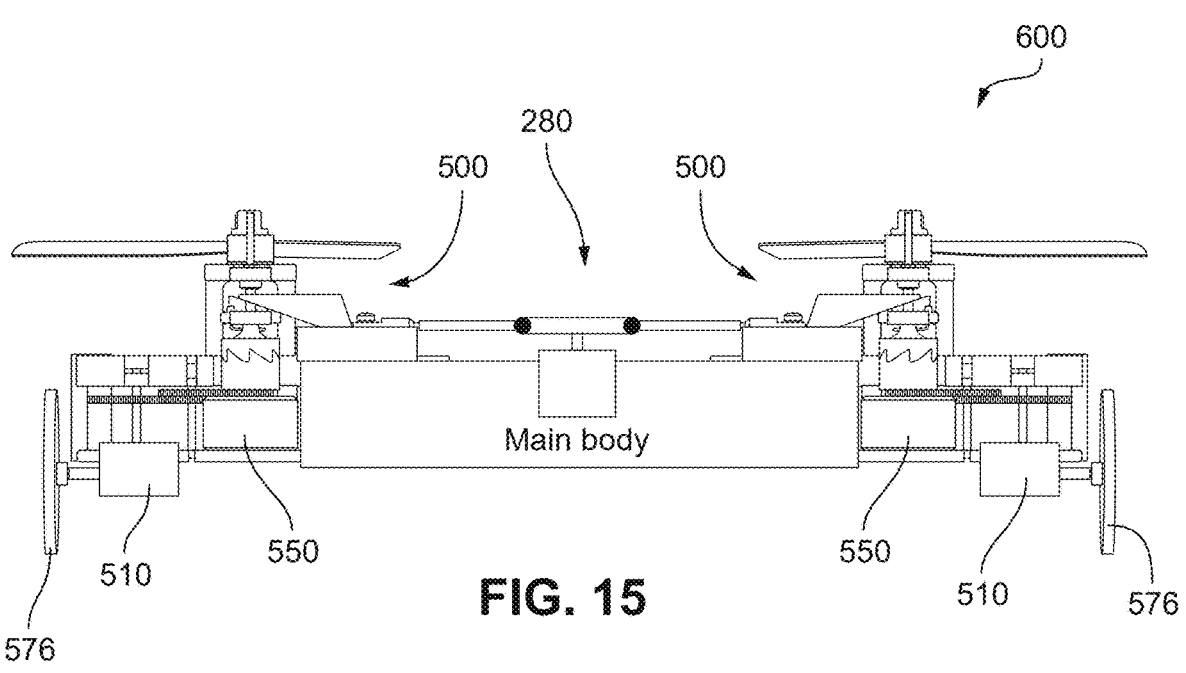
FIG. 15 shows an example of a hybrid flying and driving robot device without a sprawl configuration.

FIG. 15 shows an example of such hybrid flying and driving robot device 600 without a sprawl configuration, with the arms constantly horizontal (e.g. and may actually be part of the main body portion) and with the wheels vertically aligned and perpendicular to the horizontal alignment of the propellers. Most of the other elements are similar as to robot device 10, with the following differences. A motor 280 (e.g. Servo) is placed on the middle line of the main body portion, aligned with two respective fork elements 500 (e.g., by respective rods) such that at one servo motor 280 position the fork 500 is pushed away from the servo motor and connects the upper crown gear to the bottom crown gear, thereby being in flying mode activating the propellers, as explained herein mutatis mutandis. When changing to be in driving mode, the servo motor 280 pulls the forks 500 closer to it and the clutch mechanism as explained herein (with the springs etc.) disconnects the upper crown gear from the bottom crown gear, thereby the propellers don't rotate, only the wheels rotate, thereby being in driving mode. When changing again to be in flying mode, The servo motor causes pushing the rods connected to the forks 500 to reconnect the crown gear elements to return to flying mode, etc. similarly to as explained herein, mutatis mutandis. The gear arrangements 510 (e.g. gearbox) are arranged such that each motor 550 is configured to drive its respective vertical wheel 576.

Preferably, in cases with 4 legs, two Servo motors are placed on the middle line of the main body portion each aligned with two respective fork elements. In other embodiments one Servo motor may connect to all forks, as explained hereinabove. Preferably, the robot device further comprising a servo motor;

> wherein said servo motor is connected to each fork element by means of a rod; and
> wherein said servo motor is configured to displace each fork element towards and away from its respective ramp (e.g. by pushing/pulling the rod).

Figure 16:
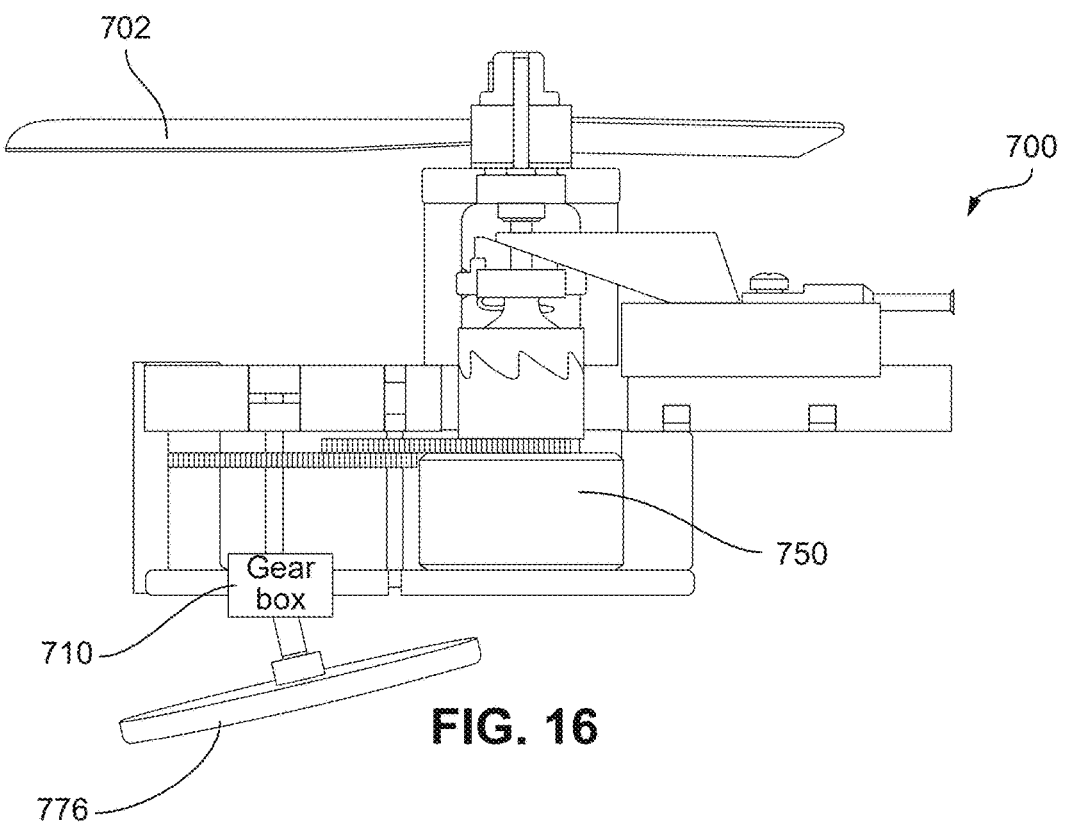
FIG. 16 shows an embodiment of a leg of a robot device with the wheels placed in a tilted manner.

According to another embodiment of the present invention, the wheels are placed in a tilted manner. FIG. 16 shows an embodiment of a leg 700 of a robot device similar to robot device 600, only with the wheels placed in a tilted manner. FIG. 16 shows the tilted wheel 776 and the gear arrangements 710 (e.g. gearbox) arranged such that each motor 750 is configured to drive its respective tilted wheel 776. The wheel 776 is actually positioned such that it has a sharp angle between it and the propeller 702. The gear arrangement (gearbox) between the motor 750 and the wheel 776 is arranged accordingly, mutatis mutandis. The other elements are similar to the elements of robot device 600 respectively, mutatis mutandis.

According to yet another (third) aspect of the present invention, the present invention comprises a clutch mechanism as explained herein. The present invention clutch mechanism may comprise the elements as explained herein, these elements may be elements from the group consisting of the fork, ramp, crown gear, motor, wheel, propeller, gear arrangements.

For the sake of brevity and clarity, the clutch mechanism will not be explained here in too much detail, as it has already been explained in detail with reference to robot device 10.

The clutch mechanism comprises:

A motor;

a bottom crown gear wherein said motor is configured to drive the rotation of said bottom crown gear;

a displaceable upper crown gear meshable with said bottom crown gear;

> wherein in a first configuration the upper crown gear is placed in a position such that the upper crown gear meshes with the bottom crown gear; and
> wherein in a second configuration the upper crown gear is placed in a position away from the bottom crown gear such that the upper crown gear does not mesh with the bottom crown gear;

a shaft fixedly connected to a first drivable member (e.g. wheel or propeller, typically connected at its center) at one end and fixedly connected to the center of the upper crown gear at its other end;

a displaceable surface above the upper crown gear; wherein the upper crown gear is fixedly attached to said displaceable surface;

wherein said displaceable surface is configured to be pushed down by a fork element and configured to be pushed up by an elastic element (e.g. spring);

wherein the elastic element is placed between the bottom of the displaceable surface and a respective surface;

wherein the fork element comprises a slanted sloping bottom surface;

wherein the displaceable surface comprises a ramp on its top;

wherein the slanted sloping bottom surface is engageable with the ramp such that when engaged:

> a) the displaceable surface moves vertically downwards when the slanted sloping bottom surface moves towards the high end of the ramp; and
> b) the displaceable surface moves vertically upwards by means of the elastic element, when the slanted sloping bottom surface moves away from the high end of the ramp.

Preferably, the clutch mechanism further comprises a second drivable member (e.g. propeller/wheel);

> wherein the motor is configured to drive the rotation of the second drivable member (e.g. by means of a gear arrangement, gearbox, typically connected at the center of the propeller/wheel).

Preferably, the present invention relates to a robot device comprising a plurality of clutch mechanisms (e.g. four) clutch mechanisms as described herein. Preferably, in each clutch mechanism, the wheel is positioned according to one of the following:

a. perpendicularly to the propeller;

b. parallel to the propeller;

c. having a sharp angle between said wheel and propeller.

The clutch mechanism may be defined also with less elements, for example, the robot device may be defined as comprising the wheels, propellers, motors, as defined herein, and the clutch mechanism with other elements, e.g. that cause the disengagement of a gear arrangement. All definitions constitute part of the present invention and are understandable to a person skilled in the art. The present invention may also be defined relating to a hybrid flying and driving robot (as described herein) comprising:

a plurality of wheels;

a plurality of propellers;

a plurality of motors, each of which is configured to drive the rotation of a respective wheel of said plurality of wheels;

wherein each respective motor of said plurality of motors is connected to a respective propeller of said plurality of propellers by means of a clutch mechanism;

wherein said clutch mechanism is rearrangeable between two positions:

> a) a first position having a connected gear arrangement (where the upper and bottom crown gears mesh) wherein the respective motor is configured to drive the rotation of the respective propeller;
> b) a second position having a disconnected gear arrangement (where the upper and bottom crown gears do not mesh) wherein the respective motor does not drive the rotation of the respective propeller.

One or more of the other elements as explained herein (e.g. the elements of robot device 10 as explained herein) may also be part of this configuration.

According to another embodiment of the present invention, the present invention relates to a clutch mechanism (as described hereinabove) in conjunction with an angular rotation of one of the two nearby surfaces (e.g. surfaces and 20a as described herein). According to this embodiment, the movement of the fork towards and away from the ramp is due to the angular displacing of one surface of the two surfaces in relation to the other. A rod (e.g. element 300) is anchored at one end to a first surface (e.g. 20a) and to the clutch mechanism fork element which is placed on a second surface (e.g. surface 30). The motor, crown gears, ramp, drivable members are all also placed on/connected to the second surface. Preferably, the leg rod is connected to the main body portion by either a U-joint or spherical joint connection; and the leg rod is connected to its respective fork element by either a U-joint or spherical joint connection.

The angular displacement may be caused by a sprawl motor (e.g. motor 80 as explained herein). For the sake of brevity and clarity, the sprawl action will not be explained here in too much detail, as it has already been explained in detail with reference to robot device 10. When the angle between the two surfaces decreases, the fork element is displaced away from the ramp (e.g. when the second surface tilts downwards). When the angle between the two surfaces increases, the fork element is displaced towards the ramp (e.g. when the second surface tilts upwards).

Returning now to robot device 10, the robot device 10 comprises a control unit comprising a processor (typically placed within the main body portion 20) connected to (e.g. coupled to) the four leg motors 150 and to the sprawl motor 80 and configured to activate them. The control unit may be connected to a receiver configured to receive remote-control instructions from a remote-control to operate the motors in a desired manner. The remote-control (e.g. a joystick) comprises a transmitter and may transmit instructions to the motor 80 to alter the sprawl angle (e.g. to increase or decrease); to motors 150 to control the flying and driving. The robot 10 may be configured to enable steering the robot device 10 (e.g. rightwards or leftwards) by using a possible steering system that the distal and/or proximal wheels are connected to). During flying the controller activates each motor which drives a respective propeller in a manner adapted for steering the flying robot device 10. The robot device 10 may perform more than one task at the same time according to the instructions given (e.g. activating at the same time—the sprawl mechanism, the wheels, the steering, etc.) The remote-control can be operated by a human operator. Optionally, the commands may be given by using a dedicated microcontroller.

The remote-control transmission may be carried out by several techniques, e.g. RF, WIFI, Bluetooth, etc. In some embodiments the controller may remotely directly transmit instructions to the motors by said transmission techniques (in which case each motor would comprise or be connected to an appropriate receiver), i.e. transmit instructions directly to the motor receivers.

The robot device 10 comprises a power source (e.g. one or more batteries), typically placed within the main body portion 20, configured to power all of the motors in the robot device 10 (and the receiver and controller and steering system, etc.). For example, the robot device 10 is powered with two-cell, three-cell or four-cell LiPo batteries.

The robot may comprise a camera, various sensors, a GPS, an inertial measurements unit carrying accelerometers and gyroscopes, all connected to and controlled by the control unit. These elements may be placed within or mounted within the main body portion.

The control unit may comprise applications for controlling the robot to navigate automatically both in land and in the air to travel autonomously from one location to another (optionally an intelligent motion planner which determines the best planning method to combine between driving and flying for minimum time and energy).

The four leg motors 150 along with the sprawl motor 80 provide a very efficient device with only five actuators.

Optionally, the control unit may activate only two motors for the driving (e.g. front wheels or back wheels).

The motors 150 may be brushless motors, for example, brushless motors of 2400 KV, weigh 34 grams and produce a torque of 0.08 Nm.

An example of the sprawl motor 80 is a Power HD 1501MG having a rotational range of 160 degrees, weighs 63 grams, and produces a maximal torque of 1.67 Nm.

The robot 10 control unit may comprise two sub controller units, for example, a RadioLink Mini Pix flight controller and electronic speed controllers (ESC's—HGLRC Forward FD50A) that can provide a continuous current of up to 50 A. The flight controller can record the power consumption at a rate of 10 Hz.

The length of robot 10 (e.g. of main body top surface 20*a*) is usually between 100 and 1000 mm. The total width of robot 10 (including the legs in flight mode) is usually between 100 and 1000 mm. The height of robot 10 (in flight mode) is usually between 50 and 300 mm. The height of robot 10 (in driving mode) is usually between 50 and 500 mm. The width of surfaces 20*a* and 20*b* are usually between 80 and 1000 mm.

The length of vertical bars 21 are usually between 10 and 200 mm.

The length of arm 30 is usually between 100 and 1000 mm. Its width is usually between 10 and 300 mm. Its thickness is usually between 1 and 50 mm.

The length of leg 70 is usually between 30 and 300 mm. Its width is usually between 10 and 100 mm. Its height is usually between 10 and 100 mm.

The radius of the wheels 76 is usually between 20 and 200 mm (e.g., its radius is 3.85 cm). Its thickness is usually between 2 and 50 mm.

The propellers 75 are usually three-bladed, with a length usually between 30 and 300 mm (e.g. 12.7 cm (5 inches) long). The blade width is usually between 5 and 50 mm. Its thickness is usually between 1 and 10 mm. As an example, the pitch of the propellers 75 may be 10.2 cm pitch (4 inches).

The length of the rod 86 is usually between 10 and 100 mm. Its diameter is usually between 1 and 10 mm.

The length of the rod 300 is usually between 10 and 100 mm. Its diameter is usually between 1 and 10 mm.

The diameter of crown gears 155 and 156 is usually between 10 and 100 mm. Each of their respective heights (including teeth) is usually between 5 and 50 mm.

The diameters of spur gears 151, 152, 152*a*, 153 may vary usually between 2 and 100 mm. Their thickness is usually between 1 and 10 mm.

The length of axle 157 is usually between 10 and 100 mm. Its diameter is usually between 1 and 10 mm.

The length of vertical bar 77 is usually between 10 and 100 mm.

The length of vertical bar 73 is usually between 10 and 100 mm.

The length of the movable surface 175 is usually between 10 and 100 mm. Its width is usually between 5 and 50 mm. Its thickness is usually between 6 and 60 mm. The height of ramp 175*r* is usually between 5 and 50 mm.

The length of fork 200 is usually between 15 and 150 mm. Its width is usually between 5 and 50 mm. Its height is usually between 5 and 5 mm.

The height of spring 180 is usually between 5 and 100 mm. Its diameter is usually between 3 and 30 mm.

The length of the rod 190 is usually between 10 and 100 mm. Its diameter is usually between 1 and 10 mm.

The length of the rotating vertical shaft 160 is usually between 5 and 50 mm. Its width/diameter is usually between 2 and 20 mm.

According to an embodiment of the present invention the robot device 10 mechanical parts are manufactured using 3D printing. For example, the following elements may be manufactured using 3D FDM (Fuse Deposition Modeling) printing: 20*a*, 21, 20*b*, 75, 76, 70, 30, 80*a*, 86, 85, 155, 156, 151, 152, 153, 157, 77, 175, 73, 190, 74, 72, 71, 160, 200, 300. The 3D printing material may be PLA material with both UpBox and Ultimaker 5 whose accuracy is roughly 0.2 mm. The clutch components, which require higher accuracy, may be printed using a Form 2 SLA printer whose accuracy is roughly 0.05 mm (the SLA-material types are Rigid and Tough). Alternatively, these elements mentioned above may be manufactured differently and may comprise plastics, metals, etc. These elements may range in size from a millimeter scale to a meter scale. Thus, the present invention may provide very small robots, medium sized robots and up to very large sized robots. Also, the weight of the present invention may vary (e.g. advantageous lightweight).

Part replacement is simplified for the entire design. Ensuring easy part replacement is essential for experimentation in different conditions in which components can be damaged. Optionally, the design of the device is such that it is easy to take the motors and other electronic elements out of the robot and replace them.

Elements such as 190 may comprise brass or other medals or other components. The spring 180 may comprise a type of metal or other material.

The following section summarizes the results of actual experiments performed with the robot 10.

Experiment 1

An experiment was performed. The experiment included flying and driving on different terrains while measuring the power consumed by the robot.

Figure 10:
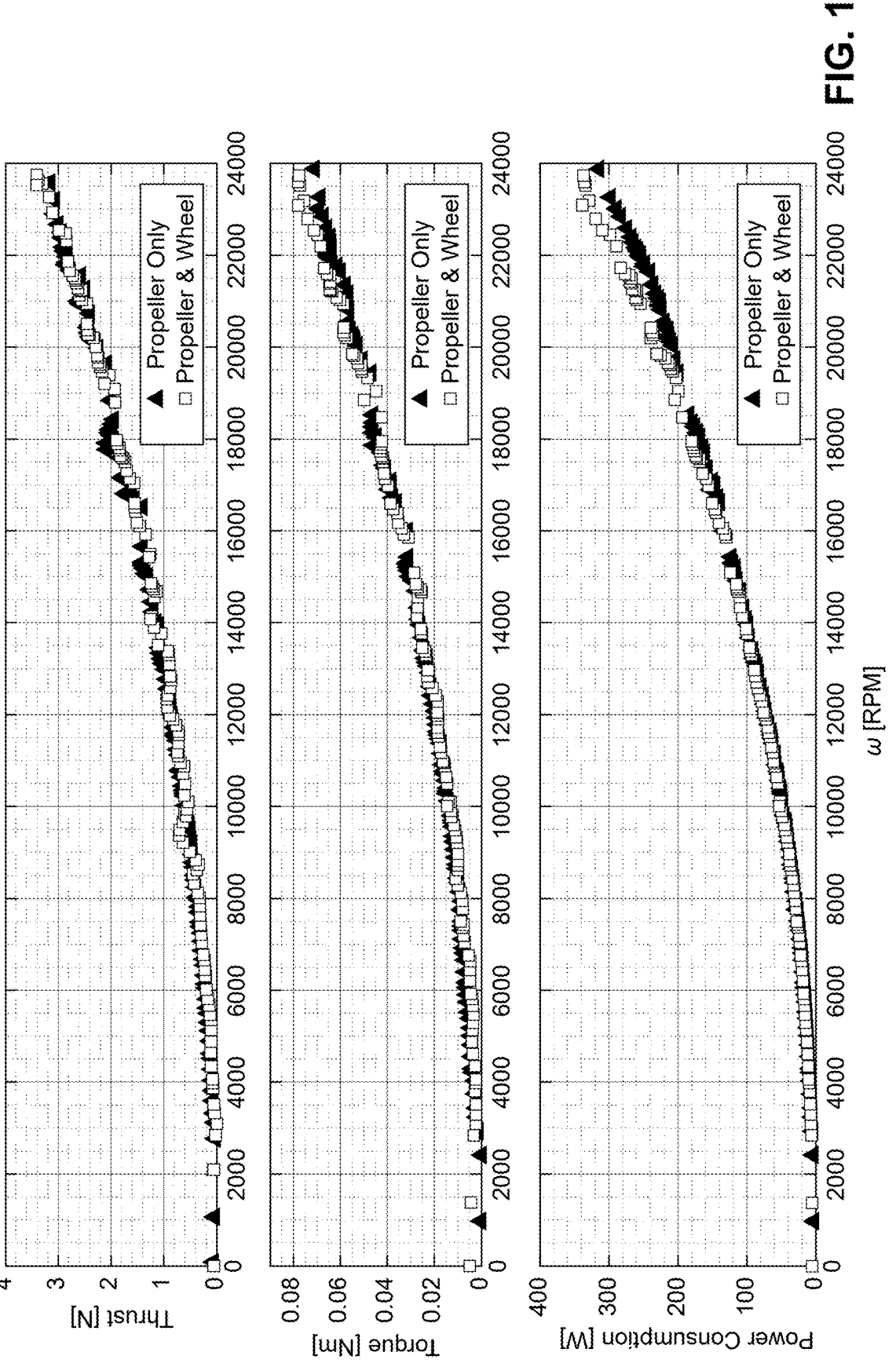
FIG. 10 shows the results of an experiment carried out according to an embodiment of the present invention.

Influence of Wheel Actuation on the Thrust, Torque and Energy of the Robot 10:

Using a "RC Benchmark 1580" dynamometer, the following were measured: the thrust force, torque and power consumption of the motor with the propeller while the clutch was connected and then disconnected. The results, presented in FIG. 10, revealed that at nearly 22,000 RPM, the motors generated enough thrust to fly. The power consumption of the motor when the wheel was attached and then disconnected (with both configurations using the clutch) was compared. At flying rotational speeds, the motor consumed 9% more energy when the wheel was connected. Given that only two back motors are connected to the wheels, the additional power consumption for flying due to the rotation of the wheels was 4.5%.

The blue triangles display experiments performed without the wheel and gearbox engaged, while the red squares display experiments done with the wheel configuration in use.

Experiment 2

Outdoor Energy Consumption Experiments

To evaluate the robot's power consumption during flying and driving, multiple experiments at different speeds were performed. The power consumption was recorded using the flying controller which recorded the current and output voltage of the battery at 10 Hz. The speed of the robot was determined from the GPS location as measured by the flight controller at 5 Hz.

The robot consumed 120.0 W, 152.4 W, and 197.5 W, respectively for driving speeds of 1 m/s, 2 m/s and 3 m/s. The energy consumption was nearly 10%-20% higher when the robot drove over grass and gravel at 2 m/s (180.9 W and 162.4 W respectively). To evaluate the efficiency of the efficacy of the clutch mechanism, the power consumption of the robot driving at 2 m/s was measured while the propellers were attached to the driving mechanism. In this case the power consumption was 314.5 W which is more than double the power consumption when the propellers are disconnected (the clutch mechanism lowers the energy consumption by 52%).

Also, multiple low speed flying experiments were performed. The robot consumed 379.2 W, 397.9 W, 412.5 W, and 430.4 W, respectively for 1 m/s, 2 m/s, 3 m/s, and 4 m/s. When flying vertically, the robot consumed 437.7 W while ascending and the same value when descending.

TABLE I

| Low Speed Flying and Driving Energy power consumption and COT | | | |
|---|---|---|---|
| | | Speed | |
| Mode | 1 m/s | 2 m/s | 3 m/s |
| Driving power [W] | 120.0 | 152.4 | 197.5 |
| Driving COT | 9.8 | 6.2 | 5.4 |
| Flying [W] | 379.2 | 397.9 | 412.5 |
| Flying COT | 31.0 | 16.3 | 11.3 |

Experiment 3

Figure 11A:
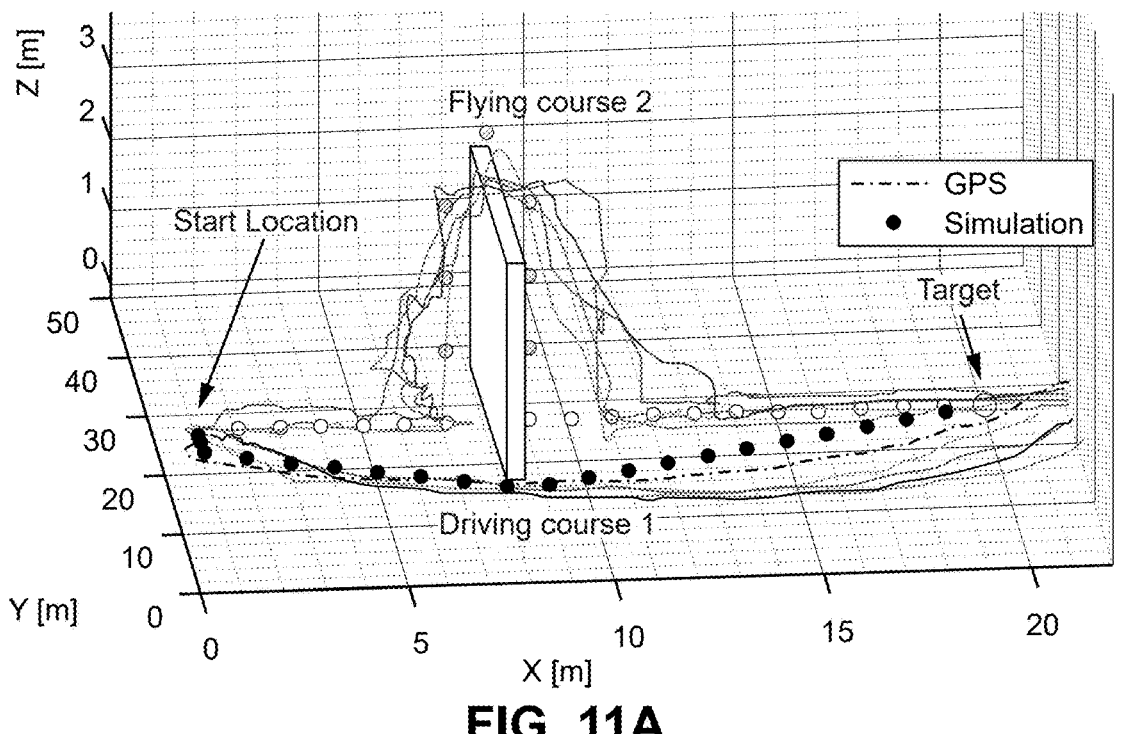
FIGS. 11A-11C show graphs relating to an experiment carried out according to an embodiment of the present invention.
Figure 11B:
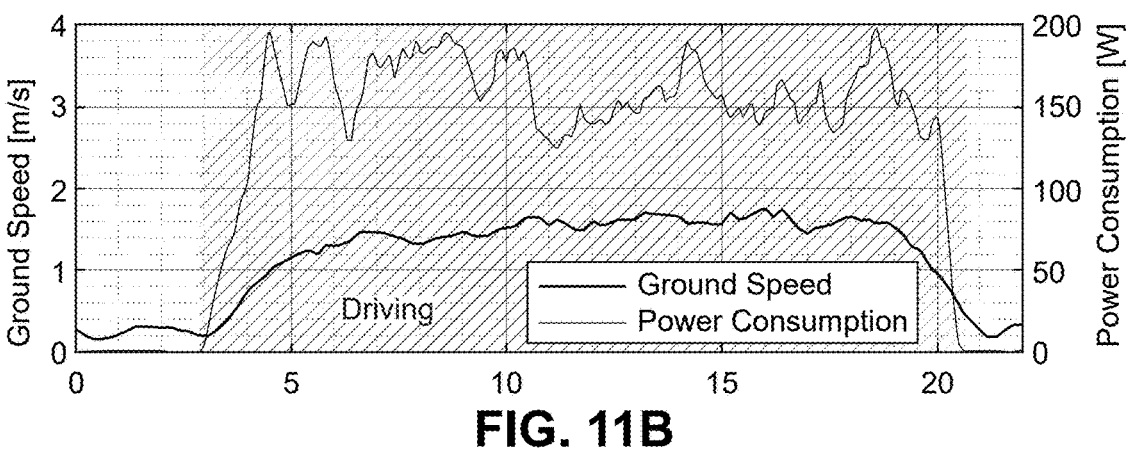
Figure 11C:
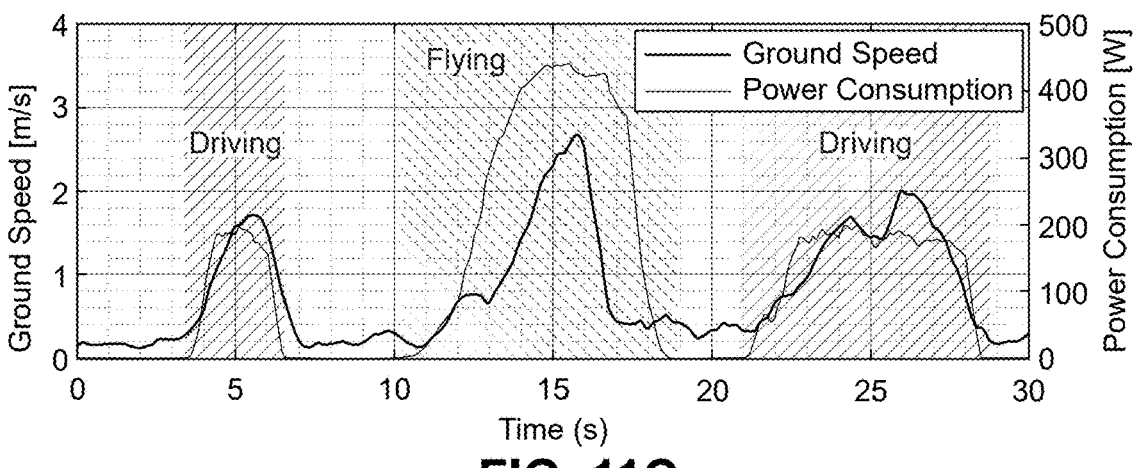
Figures 12A, 12B, 12C, 12D:
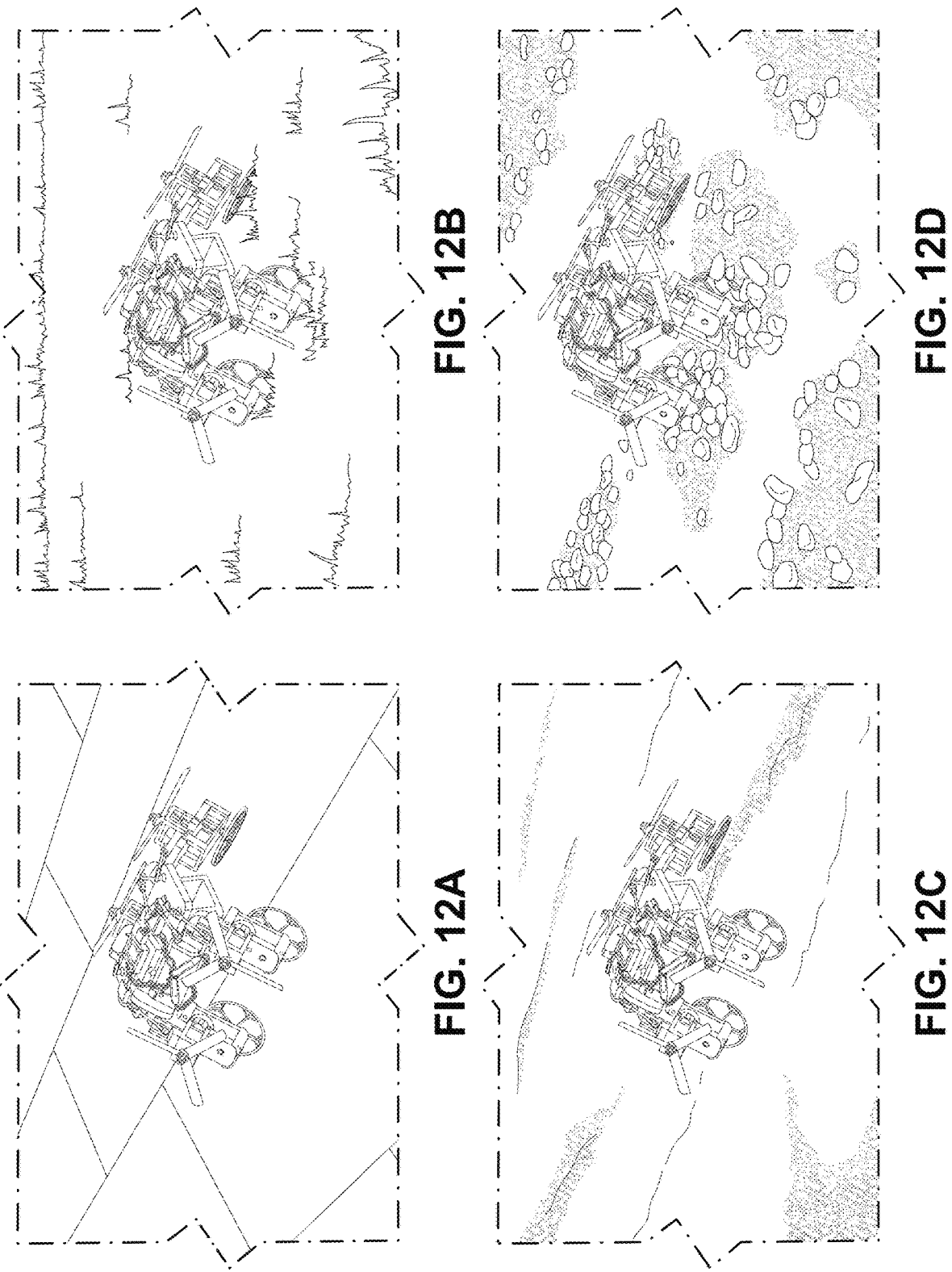
FIGS. 12A-12D show the robot driving over different surfaces according to an embodiment of the present invention.

Energy Consumption of Driving Versus Flying—Driving Combination and Comparison to Simulation In the following experiments, an obstacle environment was created. The experiments were performed by a skilled human operator, keeping the robot at a driving speed of nearly 2 m/s. The speeds were measured by the GPS reading of the robot. The actual path of the robot travelling around and over the obstacles as recorded by the robot's controller was compared to the simulation path in FIG. 11A (the GPS measurements in two experiments simulating the simulations; the blue curve represents the driving experiment, and the red curve represents driving-flying experiments). The energy cost for driving around the obstacle as well as flying over the obstacle are presented respectively in FIGS. 11B and 11C (the power consumption and speed of the robot, respectively, for the driving and flying-driving experiments as recorded by the flight controller).

The normalized energy cost for driving around the obstacles was 13.2 NEC at an average driving speed of 1.57 m/s. The data showed that there was a 14.5% increase in the predicted NEC value of the simulation. In the combination of flying and driving, the total energy consumed was 19.1 NEC, which is an 18.6% increase compared to the estimated cost from the simulation. The increased power consumption in the experiment, compared to the simulations, is likely due to the fact that the operator was not able to drive and fly the robot at a constant speed of 2 m/s and unable to exactly follow the path. However, as predicted by the algorithm, driving around the obstacle was more energy efficient as it reduced the energy consumption by 31% (the simulation predicted a decrease of 28%).

Experiment 4

Flying-Driving Performance

The robot 10 was tested in indoor and outdoor driving on different surfaces. In FIGS. 12A-12D the robot is shown driving over different surfaces (tiles, grass, dirt, and gravel, respectively) and transitioning between them. The highest driving speed recorded was 4.5 m/s over a smooth surface. To reach this speed, the robot accelerated for 4 meters at a sprawl angle of 50 degrees (where the clutch was in complete separation).

Figures 13A, 13B, 13C, 13D:
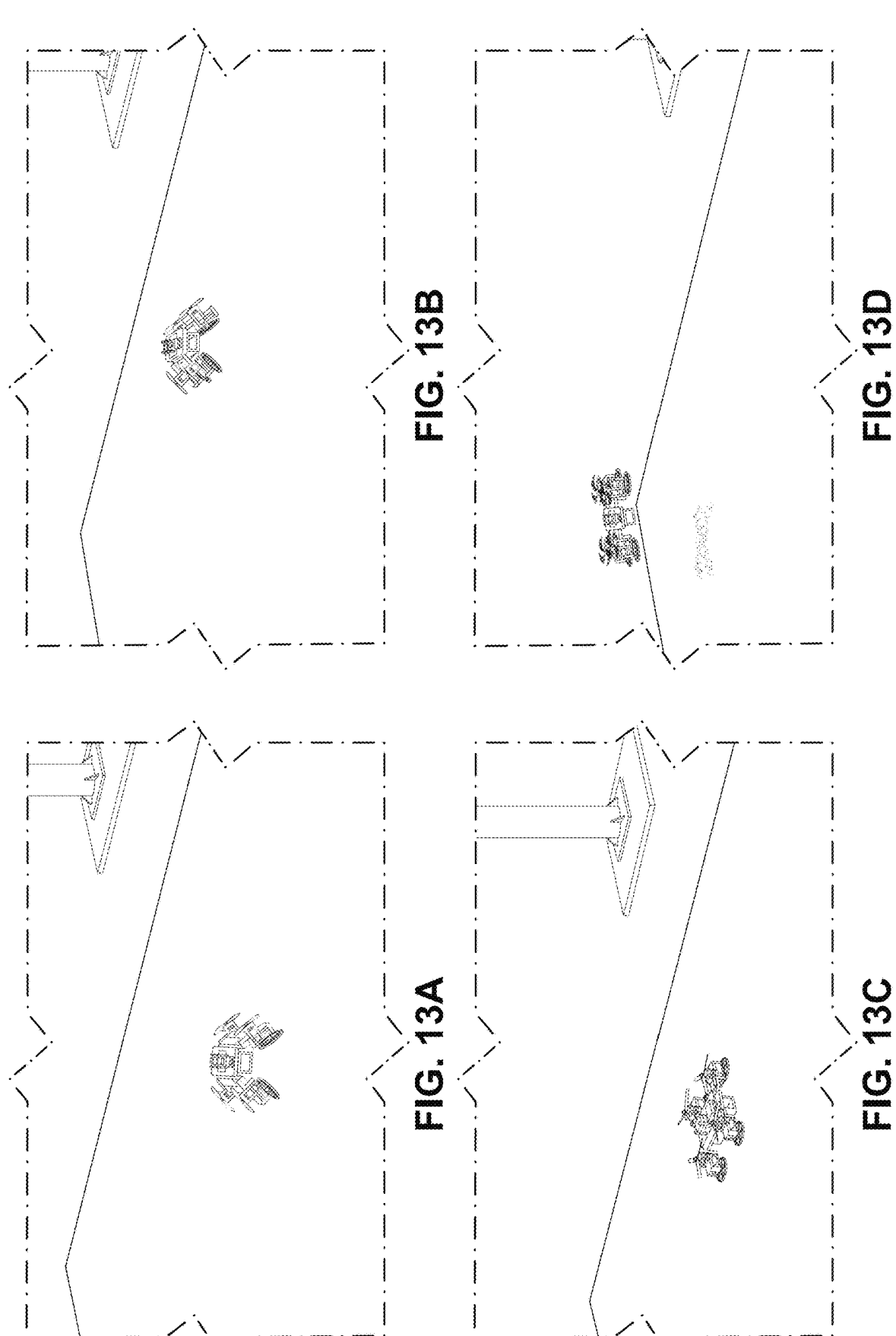
FIGS. 13A-13D show steps of the robot transitioning from driving to flying mode according to an embodiment of the present invention.

The robot 10 can smoothly reconnect its propellers after driving in order to fly. FIGS. 13A-13D shows the robot 10 transitioning from driving to flying modes driving with the propellers detached (13A-13B), sprawls up to reconnect its propellers (lifting the arms that cause the gears to reconnect) (FIG. 13C) and then flying away like a regular quadcopter (FIG. 13D). In addition, after landing, the robot can disconnect its propellers while driving, for example, at speeds of up to 1 m/s.

Figures 14A, 14B:
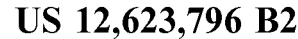
FIGS. 14A-14B show phases of the robot driving through a pipe according to an embodiment of the present invention.

Furthermore, the robot 10 was driven through a pipe whose diameter was 25 cm. FIGS. 14A-14B show the phases of the experiment with the robot 10 driving through a pipe (FIG. 14A), exiting the pipe, and continuing driving (FIG. 14B).

Disconnecting the propellers enables quieter motion and stabilizes driving by eliminating the lift force of the propellers. The present invention robot may, for example, run at 4.5 m/s (a 50% increase compared to the aforementioned publication device "flying-driving FSTAR"). In parallel, the clutch mechanism which separates the propellers from the driving mechanism while driving lowered the energy consumption by 52% (compared to driving while the propellers were rotating). Whereas flying was generally faster and enabled the robot to overcome obstacles, driving on a flat surface required less energy (38% of the energy required for flying). The present invention is especially advantageous for use in urban areas or in areas with obstacles, areas which require low speed flying in confined areas where restrictions apply.

While some of the embodiments of the invention have been described by way of illustration, it will be apparent that the invention can be carried into practice with many modifications, variations and adaptations, and with the use of numerous equivalents or alternative solutions that are within the scope of a person skilled in the art, without departing from the spirit of the invention, or the scope of the claims.

The invention claimed is:

1. A hybrid flying and driving robot comprising:
a plurality of wheels;
a plurality of propellers; and
a plurality of motors, each of which is configured to drive the rotation of a respective wheel of said plurality of wheels;
wherein each respective motor of said plurality of motors is connected to a respective propeller of said plurality of propellers by means of a respective gear arrangement;
wherein each respective gear arrangement is rearrangeable between two configurations:
a) a first configuration wherein the respective motor is configured to drive the rotation of the respective propeller; and b) a second configuration wherein the respective motor does not drive the rotation of the respective propeller; and
wherein each of the respective gear arrangements comprises:
a bottom crown gear, wherein the respective motor is configured to drive the rotation of said bottom crown gear;
a displaceable upper crown gear meshable with said bottom crown gear;
a shaft fixedly connected to the center of the respective propeller at one end and fixedly connected to the center of the upper crown gear at an other end of said shaft;
wherein in the first configuration the upper crown gear is placed in a position such that the upper crown gear meshes with the bottom crown gear; and
wherein in the second configuration the upper crown gear is placed in a position away from the bottom crown gear such that the upper crown gear does not mesh with the bottom crown gear.

2. The hybrid flying and driving robot according to claim 1, wherein said robot comprises four wheels of the plurality of wheels, four propellers of the plurality of propellors, and four motors of the plurality of motors.

3. The hybrid flying and driving robot according to claim 1, wherein said robot comprises a displaceable surface above the upper crown gear;
wherein the upper crown gear is fixedly attached to said displaceable surface;
wherein said displaceable surface is configured to be pushed down by a fork element and configured to be pushed up by an elastic element.

4. The hybrid flying and driving robot according to claim 3, wherein the elastic element is placed between the bottom of the displaceable surface and a respective surface;
wherein the fork element comprises a slanted sloping bottom surface;
wherein the displaceable surface comprises a ramp on said displaceable surface top; and
wherein the slanted sloping bottom surface is engageable with the ramp such that when engaged:
a) the displaceable surface moves vertically downwards when the slanted sloping bottom surface moves towards a high end of the ramp; and
b) the displaceable surface moves vertically upwards by means of the elastic element, when the slanted sloping bottom surface moves away from the high end of the ramp.

5. A hybrid flying and driving robot comprising:
a plurality of wheels;
a plurality of propellers;
a plurality of motors, each of which is configured to drive the rotation of a respective wheel of said plurality of wheels;
wherein each respective motor of said plurality of motors is connected to a respective propeller of said plurality of propellers by means of a respective gear arrangement;
wherein each respective gear arrangement is rearrangeable between two configurations:
a) a first configuration wherein the respective motor is configured to drive the rotation of the respective propeller; and
b) a second configuration wherein the respective motor does not drive the rotation of the respective propeller;

wherein said robot comprises four wheels, four propellers and four motors;

wherein the robot comprises:

a main body portion;

two side arms, each connected to a side of said main body portion;

two legs connected to each of the side arms;

wherein each leg comprises:

a respective motor of the motors;

a respective wheel of the wheels, connected at the bottom of the leg;

a respective propeller of the propellers, connected at the top of the leg;

wherein the two side arms are rotatable relative to the main body portion to define a variable sprawl angle; and wherein the gear arrangement is mechanically linked to the two side arms such that rotation of the two side arms actuates the gear arrangement to transition between the first configuration and the second configuration.

6. The hybrid flying and driving robot according to claim 5, wherein each of the two side arms is rotatable around an axis in a fore-aft direction of the robot.

7. The hybrid flying and driving robot according to claim 6, wherein said robot comprises a sprawl motor connected to the main body portion, configured to rotate the two side arms around the axes.

8. The hybrid flying and driving robot according to claim 7, wherein said robot comprises two arm rods, each connected between a respective side arm and the sprawl motor, such that the spawl motor is configured to displace each arm rod in a direction substantially perpendicular to the fore-aft direction of said robot, thereby causing the rotation of the two side arms.

9. The hybrid flying and driving robot according to claim 8, wherein each side arm comprises a vertical surface protruding upwards therefrom; and wherein the arm rod is connected to said vertical surface.

10. The hybrid flying and driving robot according to claim 8, wherein each of the respective gear arrangements comprises:

a bottom crown gear wherein the respective motor is configured to drive the rotation of said bottom crown gear;

a displaceable upper crown gear meshable with said bottom crown gear;

a shaft fixedly connected to the center of the respective propeller at one end and fixedly connected to the center of the upper crown gear at an other end of said shaft; and a fork element;

wherein in the first configuration the upper crown gear is placed in a position such that the upper crown gear meshes with the bottom crown gear;

wherein in the second configuration the upper crown gear is placed in a position away from the bottom crown gear such that the upper crown gear does not mesh with the bottom crown gear;

wherein said robot comprises a displaceable surface above the upper crown gear;

wherein the upper crown gear is fixedly attached to said displaceable surface;

wherein said displaceable surface is configured to be pushed down by the fork element and configured to be pushed up by an elastic element;

wherein the elastic element is placed between the bottom of the displaceable surface and a respective surface;

wherein the fork element comprises a slanted sloping bottom surface;

wherein the displaceable surface comprises a ramp on its-said displaceable surface top;

wherein the slanted sloping bottom surface is engageable with the ramp such that when engaged:

a) the displaceable surface moves vertically downwards when the slanted sloping bottom surface moves towards a high end of the ramp; and b) the displaceable surface moves vertically upwards by means of the elastic element, when the slanted sloping bottom surface moves away from the high end of the ramp; and wherein said robot comprises four leg rods, each connecting between the main body portion and a respective fork element of the fork elements, such that said leg rods enable the fork elements to move in a direction substantially perpendicular to the fore-aft direction when the two side arms are rotated.

11. The hybrid flying and driving robot according to claim 5, wherein the main body portion comprises a top surface and a bottom surface wherein objects are configured to be placed therebetween.

12. A hybrid flying and driving robot comprising: a plurality of clutch mechanisms, each of which clutch mechanism comprises:

a motor;

a wheel, wherein the motor is configured to drive the rotation of said wheel;

a bottom crown gear wherein said motor is configured to drive the rotation of said bottom crown gear;

a displaceable upper crown gear meshable with said bottom crown gear;

wherein in a first configuration the upper crown gear is placed in a position such that the upper crown gear meshes with the bottom crown gear; and wherein in a second configuration the upper crown gear is placed in a position away from the bottom crown gear such that the upper crown gear does not mesh with the bottom crown gear;

a shaft fixedly connected to a propeller at one end and fixedly connected to the center of the upper crown gear at an other end of said shaft; and a displaceable surface above the upper crown gear;

wherein the upper crown gear is fixedly attached to said displaceable surface;

wherein said displaceable surface is configured to be pushed down by a fork element and configured to be pushed up by an elastic element;

wherein the elastic element is placed between the bottom of the displaceable surface and a respective surface;

wherein the fork element comprises a slanted sloping bottom surface;

wherein the displaceable surface comprises a ramp on said displaceable surface top; and wherein the slanted sloping bottom surface is engageable with the ramp such that when engaged:

a) the displaceable surface moves vertically downwards when the slanted sloping bottom surface moves towards the high end of the ramp; and b) the displaceable surface moves vertically upwards by means of the elastic element, when the slanted sloping bottom surface moves away from the high end of the ramp.

13. The hybrid flying and driving robot according to claim 12, wherein in each clutch mechanism, the wheel is positioned according to one of the following:

a. perpendicularly to the propeller;

b. parallel to the propeller;

c. having an acute angle between said wheel and propeller.

14. The hybrid flying and driving robot according to claim 12, further comprising a pushing and pulling motor;

wherein said pushing and pulling motor is connected to each clutch mechanism fork element by means of a rod; and wherein said pushing and pulling motor is configured to displace each clutch mechanism fork element towards and away from a respective ramp of the ramps respective ramp.

* * * * *